United States Patent [19]

Kioka et al.

[11] Patent Number: 5,192,731

[45] Date of Patent: Mar. 9, 1993

[54] TITANIUM CATALYST COMPONENTS, PROCESS FOR PREPARING SAME, CATALYSTS CONTAINING SAME FOR PREPARING ETHYLENE POLYMERS AND PROCESS FOR PREPARING SAID ETHYLENE POLYMERS

[75] Inventors: Mamoru Kioka; Kazumitsu Kawakita; Akinori Toyota, all of Kuga, Japan

[73] Assignee: Mitsui Petrochemical Industries, Ltd., Tokyo, Japan

[21] Appl. No.: 781,667

[22] Filed: Oct. 23, 1991

Related U.S. Application Data

[63] Continuation of Ser. No. 415,335, Sep. 18, 1989, abandoned.

[30] Foreign Application Priority Data

| May 13, 1988 | [JP] | Japan | 63-116626 |
| May 13, 1988 | [JP] | Japan | 63-116627 |
| May 18, 1988 | [JP] | Japan | 63-122655 |
| May 18, 1988 | [JP] | Japan | 63-122656 |
| Jul. 20, 1988 | [JP] | Japan | 63-181406 |
| Jul. 20, 1988 | [JP] | Japan | 63-181407 |

[51] Int. Cl.$^5$ .............................. C08F 4/646
[52] U.S. Cl. .................. 502/110; 502/104; 502/108; 502/111; 502/115; 502/116; 502/119; 502/120; 502/125; 502/113; 502/117; 526/125
[58] Field of Search ............ 502/104, 108, 110, 111, 502/113, 115, 116, 117, 119, 120, 125

[56] References Cited

U.S. PATENT DOCUMENTS

| 4,295,991 | 10/1981 | Wristers | 502/108 X |
| 4,326,988 | 4/1982 | Welch et al. | 502/108 X |
| 4,558,024 | 12/1985 | Best | 502/115 |
| 4,558,025 | 12/1985 | Best | 502/115 |
| 4,565,797 | 1/1986 | Etherton et al. | 502/116 |
| 4,639,428 | 1/1987 | Best | 502/115 |
| 4,640,907 | 2/1987 | Best | 502/115 |
| 4,711,865 | 12/1987 | Speca | 502/116 |

FOREIGN PATENT DOCUMENTS

| 1261545 | 9/1989 | Canada | 502/119 |
| 0043220 | 6/1982 | European Pat. Off. . | |
| 0267794 | 5/1988 | European Pat. Off. . | |
| 60-195108 | 3/1985 | Japan . | |

*Primary Examiner*—Patrick P. Garvin
*Attorney, Agent, or Firm*—Sherman and Shalloway

[57] ABSTRACT

In accordance with the present invention, there are provided carrier-supported titanium catalyst components containing magnesium, aluminum, halogen and titanium as essential ingredients, which are obtained by a reaction of

[I] a magnesium containing support obtained by previously bringing a support into contact with an organometallic compound of a metal of the Group II to IIIA of the periodic table having at least one hydrocarbon group attached directly to the metal atom or with a halogen containing compound, followed by contact with a magnesium compound in the liquid state having no reducing ability,

[II] a reducing organometallic compound, and

[III] a titanium compound in the liquid state, and processes for preparing the same and, at the same time, catalysts containing the above-mentioned catalyst components for use in preparing ethylene polymer and processes for preparing ethylene polymer using the catalyst for use in preparing ethylene polymer.

20 Claims, No Drawings

TITANIUM CATALYST COMPONENTS, PROCESS FOR PREPARING SAME, CATALYSTS CONTAINING SAME FOR PREPARING ETHYLENE POLYMERS AND PROCESS FOR PREPARING SAID ETHYLENE POLYMERS

This application is a continuation of application Ser. No. 07/415,335, filed Sep. 18, 1989 and now abandoned.

FIELD OF THE INVENTION

This invention relates to titanium catalyst components capable of polymerizing olefin with high activity and thereby giving granular olefin polymers having a narrow distribution of composition of the resulting copolymer, a narrow particle size distribution and a high bulk gravity of polymer, and to processes for preparing same.

In another aspect, the invention relates to catalysts containing the above-mentioned titanium catalyst components for preparing ethylene polymers and to processes for preparing said ethylene polymers using said catalysts.

BACKGROUND OF THE INVENTION

It is known that ethylene copolymers having a density equal to that of high-pressure polyethylene may be obtained by copolymerization of ethylene and small amounts of α-olefin in the presence of a Ziegler catalyst. Generally, by reason of the fact that the polymerization is easy to operate, it is of advantage to adopt high temperature solution polymerization wherein the polymerization is carried out at a temperature higher than a melting point of the resulting copolymer in the presence of a hydrocarbon solvent. In that case, however, when polymers having a sufficiently high molecular weight are intended to obtain, the concentration of polymer in the polymerization solution must be made lower, because a viscosity of the solution increases, and accordingly there is such a problem that the productivity of copolymer per polymerizer unavoidably becomes low.

When low density ethylene copolymers are intended to obtain by slurry polymerization often used for preparing high density polyethylene, there were such problems that the resulting copolymer tends to dissolve or swell in the polymerization solvent, and not only the concentration of the slurry cannot be increased by such reasons as increase in viscosity of the polymerization solution, attachment of the resulting polymer to the wall of polymerizer and decrease in bulk density of the resulting polymer but also no long-term continuous polymerization operation becomes possible. There was also a problem from the standpoint of quality, because the copolymers obtained were found to be sticky. With the view of solving such problems as mentioned above, there have been proposed some methods wherein specific catalysts are used and prepolymerization is carried out.

In preparing low crystalline copolymers of ethylene and α-olefin, on one hand, there have heretofore been proposed many attempts to improve catalyst activities. For instance, such attempts include a method in which vanadium compounds excellent in copolymerizability are supported on carriers, a method in which oxidizing reagents are added to catalysts so as to improve activities of the catalysts, and a method for improving copolymerizability of carrier-supported titanium compounds high in activity. In these methods, however, the polymerization activity attained was still low, and the copolymerizability exhibited was not found to be sufficient, thus a further improvement was desired.

Japanese Patent L-O-P Publn. No. 195108/1985 discloses solid titanium catalyst components for olefin polymerization, which are obtained by reaction of a hydrocarbon-insoluble solid magnesium aluminum composite selected for the following ($A_1$) and ($A_2$) with a tetravalent titanium compound, said solid titanium catalyst components containing at least 10%, based on the total amount of titanium atoms, of titanium atoms in a low valence state, and 1–15 OR groups (R is a hydrocarbon group) in terms of OR/Mg (weight ratio).

($A_1$) A solid magnesium aluminum composite having a $R^1O$ group and a reducing $R^2$ group ($R^1$ and $R^2$ are each a hydrocarbon group), said composite being obtained from a magnesium compound in the liquid state formed from a mixture containing a magnesium compound and an electron donor, or from a magnesium compound in the liquid state formed from a hydrocarbon solvent solution of a magnesium compound.

($A_2$) A solid magnesium aluminum composite having a $R^1O$ group and a $R^3O$ group ($R^3$ is a hydrocarbon group), said composite being obtained by reaction of a solid magnesium compound ($B_1$) containing the $R^1O$ group but containing no reducing $R^2$ group, obtained from a liquid magnesium compound formed from a mixture containing a magnesium compound and an electron doner or from a liquid magnesium compound formed from a hydrocarbon solvent solution of a magnesium compound, a solid magnesium compound ($B_2$) containing the $R^1$ OH group, obtained from a liquid magnesium compound, or the above-mentioned ($A_1$) with an organometallic compound (C) of a metal belonging to the Group 1 to 3 of the periodic table.

An object of the present invention is to provide titanium catalyst components which exhibit excellent slurry polymerizability when used in polymerization of homopolymer of ethylene or in the case of preparation of low density ethylene copolymers by copolymerization of ethylene and α-olefin, which are readily applicable to vapor phase polymerization to prepare copolymers having a narrow composition distribution, with the result that the resulting low density ethylene copolymers can be molded into molded articles, such as film, excellent in transparency, antiblock properties and heat sealability and even in a process such as vapor phase polymerization wherein all the resulting copolymers are formed into articles of manufacture, such excellent molded articles as above can be obtained, and which are high in efficiency of utilizing starting materials when catalysts are prepared therefrom. And accordingly the subsequent waste liquid treatment becomes easy, and processes for preparing said titanium catalyst components.

Another object of the invention is to provide catalysts containing such titanium catalyst components as mentioned above for use in the preparation of ethylene polymers, and processes for preparing said ethylene polymers by using said catalysts.

DISCLOSURE OF THE INVENTION

In accordance with the present invention, there are provided carrier-supported titanium catalyst components containing magnesium, aluminum, halogen and titanium as essential ingredients, which are obtained by a reaction of [I] a magnesium containing support obtained by previously contacting a support with an organometallic compound of a metal of Group II to IIIA of the periodic table, in which at least one hydrocarbon group is attached to the metal atom, or with a halogen containing compound, followed by contacting with a liquid magnesium compound having no reducing ability, [II] a reducing organometallic compound and [III] a titanium compound in the liquid state, and processes for preparing said carrier-supported titanium catalyst components and, at the same time, catalysts containing said titanium catalyst components for preparing ethylene polymers and processes for preparing said ethylene polymers by using said catalysts for said ethylene polymers.

The present invention as disclosed above are illustrated in more detail hereinafter.

The first carrier-supported titanium catalyst components of the present invention are characterized in that they are obtained by a reaction of [I] a magnesium containing support obtained by a reaction of a support (i) previously brought into contact with an organic aluminum compound (ii) with a liquid magnesium compound having no reducing ability (iii), [II] a reducing organometallic compound and [III] a titanium compound in the liquid state.

The processes for preparing the carrier-supported titanium catalyst components of the present invention are characterized by bringing previously a support (i) into contact with an organic aluminum compound (ii) and then with a liquid magnesium compound having no reducing ability (iii) to prepare a magnesium containing support [I], and bringing the resulting magnesium containing support [I] into contact with a reducing organometallic compound ]II] and a titanium compound in the liquid state [III].

The first catalysts containing the above-mentioned carrier-supported titanium catalyst components of the present invention are characterized in that they are composed of carrier-supported titanium catalyst components (A) containing magnesium, aluminum, halogen and titanium as essential ingredients, which are obtained by a reaction of a magnesium containing support [I] obtained by a reaction of a support (i) previously brought into contact with an organic aluminum compound (ii) with a magnesium compound having no reducing ability (iii), a reducing organometallic compound in the liquid state [II] and a titanium compound in the liquid state [III], and (B) an organometallic compound catalyst component of a metal of Group I to IIIA of the periodic table.

The first process for preparing ethylene polymers by using the above-mentioned catalysts for ethylene polymers of the present invention is characterized by polymerizing or copolymerizing ethylene in the presence of said catalysts.

The second carrier-supported titanium catalyst components of the present invention containing magnesium, aluminum, halogen and titanium as essential ingredients are characterized in that they are obtained by a reaction of [I] a magnesium containing support obtained by a reaction of a support (i) previously brought into contact with an organometallic compound of a metal other than aluminum of a metal of Group II to IIIA of the periodic table in the liquid state (iia) in which at least two hydrocarbon groups are attached directly to the metal atom or with a halogen containing compound (iib), and a magnesium compound in the liquid state having no reducing ability (iii), [IIa] an organic aluminum compound and [III] a titanium compound in the liquid state.

The processes for preparing the above-mentioned carrier-supported titanium catalyst components of the present invention are characterized in that a magnesium containing support [I] is first prepared by bringing a support (i) into contact with an organometallic compound of a metal other than aluminum of Group II to IIIA of the periodic table having at least two hydrocarbon groups directly attached to the metal atom (iia) or with a halogen containing compound (iib), and then with a magnesium compound in the liquid state having no reducing ability (iii), and thereafter the resulting magnesium containing support [I] is brought into contact with an organic aluminum compound [IIa] and a titanium compound in the liquid state [III].

The second catalysts containing the above-mentioned carrier-supported titanium catalyst components of the present invention are characterized in that they are composed of a carrier-supported titanium catalyst components (A) containing magnesium, aluminum, halogen and titanium as essential ingredients, which are obtained by a reaction of [I] a magnesium containing support obtained by a reaction of a support (i) previously brought into contact with an organometallic compound (iia) of a metal other than aluminum of Group II to IIIA of the periodic table in the liquid state having at least two hydrocarbon groups directly attached to the metal atom (iia), or with a halogen containing compound (iib), and a magnesium compound in the liquid state having no reducing ability (iii), [IIa] an organic aluminum compound and [III] a titanium compound in the liquid state, and an organometallic compound catalyst component (B) of a metal of Group I to IIIA of the periodic table.

The second processes for preparing ethylene polymers of the present invention by using the above-mentioned catalysts for ethylene polymers are characterized by polymerizing or copolymerizing ethylene in the presence of said catalysts for preparing ethylene polymers.

The third carrier-supported titanium catalyst components containing magnesium, aluminum, halogen and titanium as essential ingredients of the present invention are characterized in that they are obtained by a reaction of [I] a magnesium containing support obtained by a reaction of a support (i) previously brought into contact with a hydrocarbon-containing organic aluminum compound in the liquid state (iic), a halogen containing compound (iib) and an alcohol compound (iv), [IIa] an organic aluminum compound and [III] a titanium compound in the liquid state.

The processes for preparing the above-mentioned carrier-supported titanium catalyst components of the present invention are characterized in that a magnesium containing support [I] is prepared by bringing a support (i) previously brought into contact with a hydrocarbon-containing organic magnesium compound in the liquid state (iic) into contact with a halogen-containing compound (iib) and then with an alcohol compound (iv), and thereafter the resulting magnesium containing support [I] is brought into contact with an organic aluminum compound [IIa] and a titanium compound in the liquid state [III].

The third catalysts for ethylene polymers containing the above-mentioned carrier-supported titanium catalyst components of the present invention are characterized in that they are composed of carrier-supported titanium catalyst components (A) containing magnesium, aluminum, halogen and titanium as essential ingredients, which are obtained by a reaction of [I] a magnesium containing support obtained by bringing a support (i) previously brought into contact with a hydrocarbon-containing magnesium compound in the liquid state (iic) into contact with a halogen containing compound (iib) and then with an alcohol compound (iv), [IIa] an organic aluminum compound and [III] a titanium compound in the liquid state, and an organometallic compound catalyst component (B) of a metal of Group I to IIIA of the periodic table.

The third processes for preparing ethylene polymers by using the above-mentioned catalysts for ethylene polymers are characterized by polymerizing or copolymerizing ethylene in the presence of said catalysts for preparing ethylene polymers.

BEST MODE FOR PRACTICING THE INVENTION

The present invention is illustrated below in detail.

In the present invention, the term polymerization is used to mean not only homopolymerization but also copolymerization, and the term polymer is used to mean not only homopolymer but also copolymer.

In accordance with the present invention, there are provided carrier-supported titanium catalyst components containing magnesium, aluminum, halogen and titanium as essential ingredients which are obtained by a reaction of [I] a magnesium containing support obtained by bringing a support previously brought into contact with an organometallic compound of a metal of Group II to IIIA of the periodic table having at least hydrocarbon group directly attached to the metal atom or with a halogen containing compound into contact with a magnesium compound in the liquid state having no reducing ability, [II] a reducing organometallic compound and [III] a titanium compound in the liquid state, and processes for preparing said carrier-supported titanium catalyst components and, at the same time, catalysts containing said titanium catalyst components for preparing ethylene polymers and processes for preparing said ethylene polymers by using said catalysts for said ethylene polymers.

The present invention mentioned above is illustrated below in more detail.

The first carrier-supported titanium catalyst components of the present invention are obtained by the above-mentioned reaction of [I] a magnesium containing support, [II] a reducing organometallic compound and [III] a titanium compound in the liquid state, and contain magnesium, aluminum, halogen and titanium as essential ingredients. The present first carrier-supported titanium catalyst components are obtained, for example, by bringing a support (i) into preliminary contact with an organic aluminum compound (ii), and then preparing a magnesium containing support [I] by the reaction of the thus contacted support (i) and a magnesium compound in the liquid state having no reducing ability (iii), followed by the reaction of the thus obtained magnesium containing support [I], the reducing organometallic compound [II] and the titanium compound in the liquid state [III].

Inorganic or organic porous supports can be used in the present invention as the support (i), and these supports preferably contain hydroxyl groups. The inorganic supports are preferably composed of inorganic oxides such as $SiO_2$, $Al_2O_3$, MgO, $ZrO_2$, $TiO_2$, $B_2O_3$, CaO, ZnO, BaO and $ThO_2$ or mixtures thereof, for example, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO and the like. Of these carriers, preferred are those containing at least one member selected from the group consisting of $SiO_2$ and $Al_2O_3$ as their principal component.

The inorganic oxides as mentioned above may contain small amounts of carbonates, sulfates, nitrates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$ and the like.

Properties of these supports composed of inorganic oxides may vary according to the kind of oxides used and to the process for the production thereof. However, the supports preferably used in the present invention have an average particle diameter of 5-200 μm, preferably 10-100 μm, a specific surface area of 50-1000 $m^2/g$, preferably 100-700 $m^2/g$, and a pore volume of 0.3-3.0 $cm^3/g$, preferably 0.5-2.5 $cm^3/g$. Such inorganic oxide supports as mentioned above may be used after firing usually at 150°-1000° C., preferably 200°-800° C.

Usable as organic supports are organic polymers such as polyethylene, polypropylene, polystyrene and the like.

Of the supports as illustrated above, preferred are those composed of porous inorganic compounds, particularly porous inorganic oxides.

By virtue of the use of the support (i) as mentioned above, there can be prepared with comparative ease particles of polymer, which are large in particle diameter and spherical in shape. Accordingly, the handling of the resulting polymer particles becomes easy and the particles are prevented from breaking, and hence adherence of finely divided polymer to the inside surface of wall or pipeline of the polymerizer may be prevented.

In preparing the first carrier-supported titanium catalyst components of the present invention, the support as mentioned above is brought into preliminary contact with an organic aluminum compound (ii). The organic aluminum compound (ii) used in that case may include organic aluminum compound components which can be used in combination with a titanium catalyst component when olefin is polymerized as will be mentioned later, and such organic aluminum compounds have at least one hydrocarbon group attached directly to the metal atom. Concrete examples of useful organic aluminum compounds mentioned above include trialkylaluminum such as trimethylaluminum, triethylaluminum or tributylaluminum; alkenylaluminum such as isoprenylaluminum; dialkylaluminum alkoxide such as dimethylaluminum methoxide, diethylaluminum ethoxide or dibutylaluminum butoxide; alkylaluminum sesquialkoxide such as methylaluminum sesquimethoxide or ethylaluminum sesquiethoxide; partially alkoxylated alkylaluminum having an average composition represented by $R^1_{2.5}Al(OR^2)0.5$; dialkylaluminum halide such as dimethylaluminum chloride, diethylaluminum chloride or dimethylaluminum bromide; alkylaluminum sesquihalide such as methylaluminum sesquichloride or ethylaluminum sesquichloride; partially halogenated alkylaluminum such as alkylaluminum dihalide, e.g. methylaluminum dichloride or ethylaluminum dichloride; and alumoxanes such as methylalumoxane, ethylalumoxane, isobutylalumoxane or partially halogenated methylalumoxane.

Of the organic aluminum compounds exemplified above, preferred are trialkylaluminum and dialkylaluminum chloride, particularly trimethylaluminum, triethylaluminum, triisobutylaluminum and diethylaluminum chloride. These organic aluminum compounds may be used in admixture of two or more.

In bringing the support (i) into contact with the organic aluminum compound (ii), the amount, in terms of aluminum atoms present in the organic aluminum compound, of said organic aluminum compound used per 1 g of the support is 0.1-100 mg atom, preferably 0.5-50 mg atom, more preferably 1-30 mg atom and especially preferably 1.5-20 mg atom.

The contact between the support (i) and the organic aluminum compound (ii) may be carried out, for example, by adding one or two or more of the above-mentioned organic aluminum compounds to an inert solvent in which the support has been dispersed; followed by bringing them into contact with each other at a temperature of usually at least $-50°$ C., preferably $10°-200°$ C. and more preferably $20°-130°$ C. for at least 1 minute, preferably 20 minutes to 5 hours and more preferably 30 minutes to 3 hours at ordinary pressure, under reduced pressure or under pressure.

In bringing the support (i) into contact with the organic aluminum compound (ii), it is desirable to disperse the support (i) into the inert solvent in an amount, based on 1 liter of the reaction volume, of 10-800 g, preferably 50-400 g.

The inert solvent used in practicing the contact of the support (i) with the organic aluminum compound (ii) includes aliphatic hydrocarbons such as pentane, hexane, heptane, octane, decane, dodecane, tetradecane and kerosene; alicyclic hydrocarbons such as cyclopentane, methylcyclopentane, cyclohexane, methylcyclohexane, cyclooctane and cyclohexene; aromatic hydrocarbons such as benzene, toluene, xylene, ethylbenzene, cumene and cymene; and halogenated hydrocarbons such as dichloroethane, dichloropropane, trichloroethylene, carbon tetrachloride and chlorobenzene.

Free organic aluminum compounds or reaction products which have not been fixed onto the support by the contact of the support (i) with the organic aluminum compound (ii) are desirably removed therefrom by such means as decantation or filtration.

Subsequently, after the contact of the support (i) with the organic aluminum compound (ii), said support (i) is brought into contact with a magnesium compound in the liquid state having no reducing ability (iii) to obtain a magnesium containing support [I].

The magnesium compound in the liquid state having no reducing ability (iii) used in the above case includes, for example, a solution of the magnesium compound in hydrocarbons, an electron donor (a) or mixtures thereof, or a hydrocarbon solution of the organic aluminum solution.

The magnesium compounds used in the above case include halogenated magnesium such as magnesium chloride, magnesium bromide, magnesium iodide or magnesium fluoride; alkoxy magnesium halide such as methoxy magnesium chloride, ethoxy magnesium chloride, isopropoxy magnesium chloride, butoxy magnesium chloride or octoxy magnesium chloride; aryloxy magnesium halide such as phenoxy magnesium chloride, or methylphenoxy magnesium chloride; alkoxy magnesium such as ethoxy magnesium, isopropoxy magnesium, butoxy magnesium, octoxy magnesium or 2-ethylhexoxy magnesium; aryloxy magnesium such as phenoxy magnesium or dimethylphenoxy magnesium; and magnesium carboxylate such as magnesium laurate or magnesium stearate. The magnesium compounds exemplified above may be complex or composite compounds with other metal, or mixtures with other metallic compounds, or may be mixtures of two or more of these compounds.

Of the magnesium compounds exemplified above, preferred are halogenated magnesium, alkoxy magnesium halide and aryloxy magnesium halide represented by $MgX_2$, $Mg(OR^5)X$ or $Mg(OR^5)_2$ wherein X is halogen and $R^5$ is hydrocarbon group, alkoxy magnesium, aryloxy magnesium and halogen containing magnesium, in particular, magnesium chloride, alkoxy magnesium chloride and aryloxy magnesium chloride, and especially useful is magnesium chloride.

The magnesium compound in the liquid state (iii) is suitably in the form of a solution of said magnesium compound in a hydrocarbon solvent or an electron donor (a), or of a solution of said magnesium compound in a mixture of said hydrocarbon solvent and electron donor (a).

The hydrocarbon solvent used in that case includes aliphatic hydrocarbons such as pentane, hexane, heptane, octane, decane, dodecane, tetradecane and kerocene; alicyclic hydrocarbons such as cyclopentane, methylcyclopentane, cyclohexane, methylcyclohexane, cyclooctane and cyclohexene; aromatic hydrocarbons such as benzene, toluene, xylene, ethylbenzene, cumene and cymene; and halogenated hydrocarbons such as dichloroethane, dichloropropane, trichloroethylene, carbon tetrachloride and chlorobenzene.

The above-mentioned magnesium compounds may be dissolved in hydrocarbon solvents by various procedures, though these procedures vary according to the kind of the magnesium compound and solvent used, such as a procedure wherein the hydrocarbon solvent and the magnesium compound are simply mixed together (e.g. in the case of $Mg(OR^5)_2$ wherein $R^5$ has 6-20 carbon atoms), a procedure wherein a mixture of the magnesium compound and hydrocarbon is heated, and a procedure wherein an electron donor (a), e.g. alcohol, aldehyde, amine or carboxylic acid, or a mixture thereof, or a mixture thereof with other electron donors is allowed to coexist in a hydrocarbon solvent, and the magnesium compound is mixed with the mixture of the hydrocarbon solvent and the electron donor (a), if necessary, by application of heat. For instance, the case wherein a halogen containing magnesium compound is dissolved in a hydrocarbon solvent by using an alcohol as the electron donor (a) is cited herein. Although the amount of the alcohol used varies according to the kind and amount of the hydrocarbon solvent used and to the kind of the magnesium compound used, the alcohol is used in an amount, based on 1 mole of the halogen containing magnesium compound, of at least 0.5 mole, suitably about 1 to about 20 moles, more suitably about 1.5 to about 12 moles and especially suitably about 1.8 to 4 moles. This amount of the alcohol varied more or less according to the kind of the hydrocarbon solvent, however, when an aliphatic hydrocarbon solvent and-/or an alicyclic hydrocarbon is used as the hydrocarbon solvent, it is desirable to use an alcohol of at least 6 carbon atoms in an amount, based on 1 mole of the halogen containing magnesium compound, of at least about 1 mole, suitably at least about 1.5 moles, because the halogen containing magnesium compound can be solubilized with the least possible amount of the alcohol used and the resulting catalyst component comes to have a good shape. In contrast thereto, when an alcohol of less than 6 carbon atoms is used, the use of large amounts of the alcohol per 1 mole of the halogen containing magnesium compound becomes necessary, whereas when an aromatic hydrocarbon is used as the hydrocarbon solvent, the amount of alcohol necessary for solubilizing the halogen containing magnesium compound can be minimized, irrespective of the kind of alcohol used.

The contact of the halogen containing magnesium compound with alcohol is preferably effected in the hydrocarbon medium at a temperature of usually of at least $-50°$ C., and depending on the kind of these ingredients at a temperature of at least room temperature, suitably about 80° to about 300° C., more suitably about 100° to 200° C. for a period of usually at least 1 minute, suitably about 15 minutes to about 5 hours and more suitably about 30 minutes to about 2 hours.

The alcohol used preferably includes those having at least 6 carbon atoms, for example, aliphatic alcohols such as 2-methylpentanol, 2-ethylbutanol, n-heptanol, n-octanol, 2-ethylhexanol, decanol, dodecanol, tetradecyl alcohol, undecenol, oleyl alcohol and stearyl alcohol; alyciclic alcohols such as cyclohexanol and methylcyclohexanol; aromatic alcohols such as benzyl alcohol, methylbenzyl alcohol, isopropylbenzyl alcohol, α-methylbenzyl alcohol and α, α-dimethylbenzyl alcohol; and alkoxy-containing aliphatic alcohols such as n-butyl cellosolve, 1-butoxy-2-propanol and 1-butoxy-6-hexanol. Useful alcohols other than those exemplified above include alcohols having less than 5 carbon atoms such as methanol, ethanol, propanol, butanol, ethylene glycol and methylcarbitol.

The hydrocarbon solvent is used in such an amount that the concentration in the solution of magnesium chloride compound (iii) becomes 0.1–10 mol/l, more preferably 0.5–3 mol/l.

In carrying out the contact of the contacted product of the support (i) and the organic aluminum compound (ii) with the magnesium compound in the liquid state having no reducing ability (iii), the magnesium compound in the liquid state having no reducing ability (iii) is used in such an amount that the magnesium in said magnesium compound per 1 gram atom of aluminum in said support becomes usually at least 0.1 gram atom, preferably about 0.1 to about 6 gram atom and especially preferably about 0.5 to about 3 gram atom. Such the reaction as above may be carried out under the conditions such that the support (i) exists, for example, at a concentration of 10–800 g/l, preferably 50–400 g/l. In order to attain such concentration of the support (i), the hydrocarbon solvent mentioned later may be added suitably.

The reaction as mentioned above may be carried out by effecting the contact at a temperature usually at least $-50°$ C., suitably from room temperature to 200° C. and more suitably 30°–100° C. for a period of usually at least 1 minute, more suitably 30 minutes to 3 hours.

The first carrier-supported titanium catalyst components of the present invention are obtained by carrying out the reaction of the magnesium containing support [I] which are obtained in the manner as mentioned above, a reducing organometallic compound [II] and a titanium compound in the liquid state [III].

The above-mentioned components may be brought into contact with one another by various procedures, for example, a procedure wherein the magnesium containing support [I] is brought into contact with the organometallic compound [II], followed by contact with the titanium compound [III], a procedure wherein the magnesium containing support [I] is brought into contact with the titanium compound [III], followed by contact with the organometallic compound [II], or a procedure wherein the magnesium containing support [I], the organometallic compound [II] and the titanium compound [III] are brought simultaneously into contact with one another. In carrying out such contact as above, hydrocarbon solvents as will be mentioned later may be used.

In effecting the contact among these ingredients as mentioned above, there may be used, based on 1 gram atom of magnesium in the magnesium containing support [I], for example, the organometallic compound [II] in an amount of 0.1–10 gram atom, preferably 0.3–5 gram atom and especially preferably 0.5–2 gram atom, and the titanium compound in an amount of usually less than 2 gram atom, preferably 0.01–1.5 gram atom and especially preferably 0.08–1.2 gram atom. In the above case, the magnesium containing support [I] used may have such a concentration that the amount of the support becomes, for example, 10–800 g/l, preferably 50–400 g/l. In order to maintain the concentration of the magnesium containing support [I] at this level, there may be added suitably such hydrocarbon solvents as will be mentioned later. This reaction may be carried out at a temperature of usually at least $-50°$ C., suitably from room temperature to 200° C., more suitably 30°–100° C. for a period of usually at least 1 minute, more suitably from about 30 minutes to about 3 hours.

In addition to organic aluminum compound components for use in polymerization of olefin as will be mentioned later or the organic aluminum compound (ii) mentioned previously, the organometallic compound [II] usable in the above-mentioned reaction includes organic zinc such as zinc diethyl, organic lithium, Grinard reagents, magnesium compounds having reducing ability such as dialkylmagnesium compounds and complexes of these organic magnesium compounds with other organometallic compounds, for example, those represented by the formula $M_\alpha Mg_\beta R^1_p R^2_q X_r Y_s$ (wherein M is aluminum, zinc, boron or beryllium atom, $R^1$ and $R^2$ each is a hydrocarbon group, X and Y each is a group such as $OR^3$, $OSiR^4R^5R^6$, $NR^7R^8$, or $SR^9$, $R^3$, $R^4$, $R^5$, $R^6$, $R^7$ and $R^8$ each is a hydrocarbon group, $R^9$ is a hydrocarbon group, $\alpha,\beta > 0$, $p,q,r,s \geq 0$, $\beta/\alpha \geq 0.5$, $p+q+r+s = m\alpha + 2\beta$ (in which m is a valence of M), and $0 \leq (r+s)/(\alpha+\beta) < 1.0$). Of these organometallic compounds mentioned above, preferred are organic aluminum compound or organic magnesium compounds, and the organic aluminum compounds are much preferred. Of the organic aluminum compounds, particularly preferred is trialkylaluminum or dialkylaluminum halide which may be used also in combination.

The titanium compound in the liquid state [III] suitably includes tetravalent titanium compounds usually represented by the formula $Ti(OR)_g X_{4-g}$ (wherein R is a hydrocarbon group, X is halogen, and $0 \leq g \leq 4$). More particularly, these titanium compounds include titanium tetrahalides such as $TiCl_4$, $TiBr_4$, and $TiI_4$; alkoxytitanium trihalides such as $Ti(OCH_3)Cl_3$, $Ti(OC_2H_5)Cl_3$, $Ti(O\ n-C_4H_9)Cl_3$, $Ti(O\ iso-C_4H_9)Cl_3$, $Ti(OC_2H_5)Br_3$, $Ti(O\ iso-C_4H_9)Br_3$ and $Ti(O\ 2\text{-ethylhexyl})Cl_3$; alkoxytitanium dihalides such as $Ti(OCH_3)_2Cl_2$, $Ti(OC_2H_5)_2Cl_2$, $Ti(O\ n-C_4H_9)_2Cl_2$, and $Ti(OC_2H_5)_2Br_2$; trialkoxytitanium monohalides such as $Ti(OCH_3)_3Cl$, $Ti(OC_2H_5)_3Cl$, $Ti(O\ n-C_4H_9)_3Cl$ and $Ti(OC_2H_5)_3Br$; and tetraalkoxytitanium such as $Ti(OCH_3)_4$, $Ti(OC_2H_5)_4$, $Ti(O\ n{-}C_4H_9)_4$, $Ti(O\ iso{-}C_4H_9)_4$ and $Ti(O\ 2\text{-ethylhexyl})_4$, or mixtures thereof with other metallic compounds such as aluminum compounds, silicon compounds and the like.

Further, there may be used also tetravalent organic titanium compounds represented by $R_jTiX_{4-j}$ wherein R is a hydrocarbon group, X is halogen, and $0<j\leq 4$. More particularly, these organic titanium compounds include titanium dihalides such as biscyclopentadienyl titanium dichloride and titanium compounds containing no halogen such as biscyclopentadienyl titanium dimethyl.

Furthermore, there may be used also trivalent titanium compounds represented by $Ti(OR)_hX_{3-h}$ wherein R is a hydrocarbon group, X is halogen, and $0\leq h\leq 3$. Of these trivalent titanium compounds, those which are not liquid in themselves may be used after dissolving them in hydrocarbons, alcohols or ethers. These trivalent titanium compounds include, for example, $TiCl_3$, $Ti(OC_2H_5)_3$, $Ti(O\ n-C_4H_9)_3$, $Ti(O\ iso-C_4H_9)_3$, $Ti(O\ 2-ethylhexyl)_3$ and $Ti(O\ 2-ethylhexyl)Cl_2$.

Of the titanium compounds exemplified above, those which are usable as the titanium compound in the liquid state [III] are preferably tetravalent titanium compounds, particularly halogen containing tetravalent titanium compounds.

The titanium compounds in the liquid state [III] may be used, as they are, when they are in liquid state, or may be used in the form of mixture thereof, or the titanium compounds in solid state may be used after dissolving in solvents such as hydrocarbons and the like.

In the carrier-supported titanium catalyst components obtained in the manner as mentioned above, Ti/Mg (atomic ratio) is usually larger than 0.01 but not greater than 1, preferably larger than 0.05 but not greater than 0.6, Al/Mg (atomic ratio) is larger than 0.5 but not greater than 4, preferably larger than 1 but not greater than 3, halogen/Mg (atomic ratio) is larger than 2 but not greater than 10, preferably larger than 3 but not greater than 6, RO group/Mg (R is a hydrocarbon group) in terms of weight ratio is larger than 1 but not greater than 15, preferably larger than 1.5 but not greater than 10 and especially preferably larger than 2 but not greater than 6, the specific surface area is 50-1000 m²/g, preferably 100-500 m²/g, and an average valence of Ti is usually not greater than 4, preferably 3.5-2.5. These titanium catalyst components have a particle diameter of usually 5-200 μm, preferably 10-100 μm, and especially preferably 20-60 μm, and a particle size distribution of usually 1.0-2.0 in terms of geometric standard deviation.

In preparing the first titanium catalyst component of the present invention, usable hydrocarbon solvents include aliphatic hydrocarbons such as pentane, hexane, heptane, octane, decane, dodecane, tetradecane and kerosene; alicyclic hydrocarbons such as cyclopentane, methylcyclopentane, cyclohexane, methylcyclohexane, cyclooctane and cyclohexane; aromatic hydrocarbons such as benzene, toluene, xylene, ethylbenzene, cumene and cymene; and halogenated hydrocarbons such as dichloroethane, dichloropropane, trichloroethylene, carbon tetrachloride and chlorobenzene.

The second carrier-supported titanium catalyst components of the present invention are obtained by a reaction of [I] a magnesium containing support [IIa] an organic aluminum compound and [III] a titanium compound in the liquid state said magnesium containing support being obtained by bringing a support (i) previously brought into contact with an organometallic compound of a metal other than aluminum of Group II to IIIA of the periodic table in the liquid state having at least two hydrocarbon groups directly attached to the metal atom (iia) or with a halogen containing compound in contact with a magnesium compound having no reducing ability (iii), and these catalyst components contain magnesium, aluminum, halogen and titanium as essential ingredients.

The second carrier-supported titanium catalyst components of the present invention as mentioned above may be prepared, for example, by bringing previously the support (i) into contact with the organometallic compound of a metal other than aluminum of Group II to IIIA of the periodic table in the liquid state having at least two hydrocarbon groups directly attached to the metal atom (iia) or with a halogen containing compound (iib), and then bringing the support (i) thus contacted into contact with a magnesium compound in the liquid state having no reducing ability (iii) to prepare a magnesium containing support [I], followed by contact with an organic aluminum compound [IIa] and a titanium compound in the liquid state [III].

In preparing the second carrier-supported titanium catalyst components as mentioned above, the support (i), the magnesium compound in the liquid state having no reducing ability (iii) and the titanium compound in the liquid state [III] used are similar to the support (i), the magnesium compound in the liquid state having no reducing ability (iii) and the liquid titanium compound in the liquid state [III], respectively, used in preparing the first carrier-supported titanium catalyst components of the present invention. The organometallic compound of a metal other than aluminum of Group II to IIIA of the periodic table in the liquid state having at least two hydrocarbon groups directly attached to the metal atom (iia), the halogen containing compound (iib) and the organic aluminum compound [IIa] are illustrated hereinafter.

The organometallic compound of a metal other than aluminum of Group II to IIIA of the periodic table in the liquid state having at least two hydrocarbon groups directly attached to the metal atom (iia) includes organic magnesium compounds, organic boron compounds, organic beryllium compounds and organic zinc compounds. Of these compounds mentioned above, preferred are organic magnesium compounds. Particularly, organic magnesium compounds represented by the formula $R_1MgR_2$ (wherein $R_1$ and $R_2$ may be the same or different and are each alkyl of 1-12 carbon atoms or aryl) are preferred. More particularly, useful organic magnesium compounds of the above formula include diethyl magnesium, dipropyl magnesium, dibutyl magnesium, butylethyl magnesium, dihexyl magnesium and diphenyl magnesium. These organometallic compounds (iia) may be used in the form of complex compounds with ethers such as diethyl ether, aluminum alkoxides such as aluminum isopropoxide, and organometallic compounds, in particular, organic aluminum compounds such as triethyl aluminum. These organometallic compounds (iia) or the above-mentioned complex compounds of said organometallic compounds (iia) with such compounds as mentioned above may be used as solutions thereof in hydrocarbon solvents. The hydrocarbon solvents usable in the above case are such hydrocarbon compounds as will be mentioned later.

The contact of the support (i) with the organometallic compound of a metal other than aluminum of Group II to IIIA of the periodic table in the liquid state having at least two hydrocarbon groups directly attached to the metal atom (iia) may be effected under the conditions similar to those under which the support (i) is brought into contact with the organic aluminum (ii) in preparing the first carrier-supported titanium catalyst component of the present invention, except for replacing the organic aluminum (ii) with the above-mentioned organometallic compound (iia).

Further, the contacted product obtained by the contact of the support (i) with the above-mentioned organometallic compound (iia) may be brought into contact with the magnesium compound in the liquid state having no reducing ability (iii) under the same conditions as in the case of preparing the first carrier-supported titanium catalyst component of the present invention.

The halogen containing compound (iib) includes compounds having halogen atoms directly attached to silicon, tin, phosphorus, sulfur, titanium or vanadium element, as well as halogenated hydrocarbons, hydrogen halides and halogens. The halogen containing compound (iib) also includes compounds in which hydrocarbon, alkoxy or aryloxy groups, or oxygen or hydrogen is attached, together with the halogen groups, to the above-mentioned elements such as silicon.

The compounds having only halogen groups attached to the above-mentioned elements may include, in concrete, $SiCl_4$, $PCl_3$, $P_2Cl_4$, $S_2Cl_2$, $SCl_2$, $SCl_4$, $TiCl_4$ and $VCl_4$.

The compounds in which hydrocarbon, alkoxy or aryloxy groups, or oxygen or hydrogen is attached, together with the halogen groups, to the above-mentioned elements include, in concrete, $HSiCl_3$, $CH_3SiCl_3$, $EtOSiCl_3$, $Cl_2SiHCl$, $VOCl_3$ and $SOCl_2$. Of these compounds, particularly preferred are halogen containing silicon compounds such as $SiCl_4$, $HSiCl_3$ and $CH_3SiCl_3$, halogen containing titanium compounds such as $TiCl_4$ or HCl.

These halogen containing compounds (iib) may also be used as their solutions in hydrocarbon solvents which include hydrocarbon compounds as will be mentioned later.

The halogen containing compound (iib) when brought into contact with the support (i) is used in an amount, based on 1 g of the support, of usually at least 1 mg, preferably 20–10,000 mg, more preferably 30–5,000 mg and especially preferably 50–500 mg.

The contact of the support (i) with the halogen containing compound (iib) may be effected under the same conditions as in the case of preparing the first carrier-supported titanium catalyst component of the present invention, with the exception that the organic aluminum (ii) is replaced with the above-mentioned halogen containing compound (iib) and the amount of the halogen containing compound is changed as indicated above.

The contacted product obtained by the contact of the support (i) with the above-mentioned halogen containing compound (iib) may be brought into contact with the magnesium compound in the liquid state having no reducing ability (iii) under the same conditions as in the case of preparing the first carrier-supported catalyst component of the present invention.

The second carrier-supported titanium catalyst components of the present invention may be prepared by bringing the magnesium containing support [I] prepared in the manner as mentioned above into contact with the organic aluminum compound [IIa] and the titanium compound in the liquid state [III], and the organic aluminum compound [IIa] used in this case is the same one as used in the case of preparing the first carrier-supported titanium catalyst component of the present invention.

The second carrier-supported titanium catalyst components of the present invention may be prepared by the contact of the magnesium containing support [I] with the organic aluminum compound [IIa] and the titanium compound in the liquid state [III] under the same conditions as in the preparation of the first carrier-supported titanium catalyst components of the invention.

The third carrier-supported titanium catalyst components of the present invention, which will be illustrated in detail hereinafter, is obtained by a reaction of [I] a magnesium containing support obtained by a reaction of a support (i) previously contacted with a organic magnesium compound in the liquid state containing hydrocarbon group (iic) with a halogen containing compound (iib) and an alcohol compound (iv), with [IIa] an organic aluminum compound and [III] a titanium compound in the liquid state, and contains magnesium, aluminum, halogen and titanium as essential ingredients.

The third carrier-supported titanium catalyst components of the present invention may be obtained by bringing the support (i) previously into contact with the organic magnesium compound in the liquid state having hydrocarbon group (iic), and then bringing the resulting contacted product into contact with the halogen containing compound (iib) and then with the alcohol compound (iv), followed by contact with the organic aluminum compound [IIa] and the titanium compound in the liquid state [III].

In preparing the third carrier-supported catalyst components as mentioned above, the support (i), halogen containing compound (iib), organic aluminum compound [IIa] and titanium compound in the liquid state [III] used are the same ones as used in the case of preparing the second carrier-supported titanium catalyst components of the invention. Hence, the organic magnesium compound in the liquid state containing hydrocarbon group (iic) and an alcohol compound (iv) are illustrated hereinafter.

The hydrocarbon-containing organic magnesium compounds in the liquid state (iic) are such compounds as represented by the general formula $M_aMg_bR^1_cX_d$ wherein M is aluminum, zinc, boron, beryllium, sodium or potassium, $R^1$ is a hydrocarbon group, for example, alkyl or aryl, and X is halogen, or such group as $OR^2$, $OSiR^3R^4R^5$, $NR^6R^7$ or $SR^8$, $a>0$, $b>0$, $c>0$, $d>0$, when the valence number of M is n, $na+2b=c+d$ is satisfied, $R^1_c$ and $X_d$ may be individually the same or different, $R^2$, $R^3$, $R^4$, $R^5$, $R^6$ and $R^7$ are each hydrogen or a hydrocarbon group, and $R^8$ is a hydrocarbon group.

In the general formula as mentioned above, the hydrocarbon groups represented by $R^1$, $R^2$, $R^3$, $R^4$, $R^5$, $R^6$, $R^7$ and $R^8$ are each methyl, ethyl, n-propyl, isopropyl, n-butyl, isobutyl, sec-butyl, tert-butyl, n-pentyl, n-hexyl, n-octyl, 2-ethylhexyl, n-decyl, cyclohexyl, phenyl and p-tolyl, and a/b is not greater than 50, particularly not greater than 10, and d is preferably smaller than a+b.

Concrete examples of the hydrocarbon-containing liquid organic magnesium compounds (iic) as illustrated above are dibutyl magnesium, dipropyl magnesium, butylethyl magnesium, dihexyl magnesium, diphenyl magnesium, dioctyl magnesium, di-2-ethylhexyl magnesium, butyl magnesium chloride, ethyl magnesium chloride, phenyl magnesium chloride or complexes thereof with other organometallic compounds such as organic aluminum compounds.

These organic magnesium compounds or organic complexes thereof are handled as their solutions in hydrocarbon compounds or ethers as will be mentioned later. In dissolving the above-mentioned organic magnesium compounds in hydrocarbon compounds, ether compounds such as diethyl ether or aluminum alkoxide compounds such as aluminum isopropoxide may be allowed to coexist therewith.

When the contact of the support (i) with the organic magnesium compound in the liquid state (iic) is carried out, said organic magnesium compound (iic) is used in an amount, based on 1 g of said support, of usually 0.1-100 mg atom, preferably 0.5-50 mg atom, more preferably 1-30 mg atom and especially preferably 1.5-20 mg atom.

The reaction may be carried out at a temperature of usually at least $-50°$ C., preferably $10°-200°$ C., and more preferably $20°-130°$ C., for a period of at least 1 minute, preferably from 20 minutes to 5 hours, and more preferably from 30 minutes to 3 hours under reduced pressure or under pressure by bringing the support (i) into contact with the organic magnesium compound (iic).

The contact of the support (i) with the organic magnesium compound in the liquid state (iic) is preferably effected while dispersing in an inert solvent the support (i) in an amount, based on 1 liter of the reaction volume, of usually 10-800 g, preferably 50-400 g.

The inert solvent used in effecting the contact of the support (i) with the organic magnesium compound (iic) includes such hydrocarbon solvents as will be mentioned later.

Free organic magnesium compound (iic) or a reaction product thereof which has not been fixed onto the support (i) by the contact of said support (i) with the organic magnesium compound (iic) is preferably removed therefrom by decantation or filtration.

After bringing the support (i) into contact with the organic magnesium compound in the liquid state (iic), the resulting contacted product is brought into contact with such halogen containing compound (iib) as already mentioned previously.

Halogen containing alcohols such as 2-chloroethanol, 2,2,2-trichloroethanol and 1-chloro-2-propanol may also be used as the halogen containing compound (iib).

In bringing the support treated with the organic magnesium compound in the liquid state (iic) into contact with the halogen containing compound (iib), the amount, based on 1 g of the support, of said halogen containing compound (iib) used is usually at least 1 mg, preferably 20-10,000 mg, more preferably 30-5,000 mg and especially preferably 50-500 mg.

The contact of the support with the halogen containing compound (iib) may be effected, for example, by adding one or two or more of the halogen containing compounds mentioned above to an inert solvent in which the support has been dispersed at a temperature of usually at least $-50°$ C., preferably $10°-100°$ C. and more preferably $20°-90°$ C. for a period of at least 1 minute, preferably from 20 minutes to 5 hours and more preferably from 30 minutes to 3 hours under reduced pressure or under pressure.

The contact of the support (i) with the halogen containing compound (iib) is preferably effected while dispersing in inert solvents the support in an amount, based on 1 liter of the reaction volume, of usually 10-800 g, preferably 50-400 g.

The inert solvents used in the contact of the support (i) with the halogen containing compound (iib) are such hydrocarbon solvents as will be mentioned later.

Free halogen containing compound (iib) or a reaction product thereof which has not been fixed onto the support (i) by the contact of said support with the halogen containing compound (iib) is preferably removed therefrom by decantation or filtration.

The support treated in the manner mentioned above with the hydrocarbon-containing organic magnesium compound in the liquid state (iic) and then with the halogen containing compound (iib) is further brought into contact with an alcohol compound (iv). The alcohol compound (iv) used in this case includes saturated and unsaturated alcohol compounds of 1-20 carbon atoms. Such alcohol compounds (iv) as mentioned above are preferably alcohols of at least 6 carbon atoms, and concrete examples of these alcohols are aliphatic alcohols such as 2-methylpentanol, 2-ethylbutanol, n-heptanol, n-octanol, 2-ethylhexanol, decanol, dodecanol, tetradecyl alcohol, undecenol, oleyl alcohol and stearyl alcohol; alicyclic alcohols such as cyclohexanol and methylcyclohexanol; aromatic alcohols such as benzyl alcohol, methylbenzyl alcohol, isopropylbenzyl alcohol, α-methylbenzyl alcohol and α,α-dimethylbenzyl alcohol; and aliphatic alcohols containing alkoxy group such as n-butyl cellosolve, 1-butoxy-2-propanol and 1-butoxy-6-hexanol. Alcohols of less than 6 carbon atoms such as methanol, ethanol, propanol, butanol, ethylene glycol and methyl carbitol may also be used as the alcohol compound (iv).

The reaction of the above-mentioned alcohol compounds (iv) and the support (i) is carried out at a temperature of usually at least $-50°$ C., preferably from room temperature to $200°$ C. and more preferably $30°-100°$ C. for a period of usually at least 1 minute, preferably from 30 minutes to 3 hours.

The third carrier-supported titanium catalyst components of the present invention are obtained by bringing the magnesium containing support [I] prepared in the manner as mentioned above into contact with the organic aluminum compound [IIa] and the liquid titanium compound [III], wherein said organic aluminum compound [IIa] and said titanium compound in the liquid state [III] used are individually the same as used in preparing the first carrier-supported titanium catalyst components of the invention.

The preparation of the third carrier-supported titanium catalyst components of the present invention may be accomplished by using the magnesium containing support [I], the organic aluminum compound [IIa] and the titanium compound in the liquid state [III] under the same conditions as used in preparing the first carrier-supported titanium catalyst components of the invention.

The catalysts for preparing ethylene polymers of the present invention are composed of the carrier-supported titanium catalyst components (A) obtained in the manner as above and the organometallic compound catalyst components (B) of metals of Group I to IIIA of the periodic table. This organometallic compound catalyst components (B) are preferably organic aluminum compounds having in the molecule at least one Al-carbon bond, for example, (i) such organic aluminum compounds as represented by the general formula $R^1{}_m Al(OR^2)_n H_p X_q$ wherein $R^1$ and $R^2$ each is a hydrocarbon group having usually 1–15 carbon atoms, preferably 1–4 carbon atoms, $R^1$ and $R^2$ may be the same or different, X is halogen, $0 < m \leq 3$, $0 \leq n < 3$, $0 \leq p < 3$, $0 \leq q < 3$, and $m+n+p+q=3$, and (ii) such complex alkylated product as represented by the general formula $M^1AlR^1_4$ wherein $M^1$ is Li, Na or K, and $R^1$ is as defined above.

The organic aluminum compounds belonging to the above-mentioned (i) include those represented by the general formula $R^1_mAl(OR^2)_{3-m}$ wherein $R^1$ and $R^2$ are as defined above, and m is preferably a number of $1.5 < m < 3$, the general formula $R^1_mAlX_{3-m}$ wherein $R^1$ is as defined above, X is halogen, and m is preferably $0 < m < 3$, the general formula $R^1_mAlH_{3-m}$ wherein $R^1$ is as defined above and m is preferably $2 \leq m < 3$, or the general formula $R^1_mAl(OR^2)_nX_q$ wherein $R^1$ and $R^2$ are as defined above, X is halogen, $0 < m \leq 3$, $0 \leq n < 3$, $0 \leq q < 3$, and $m+n+q=3$.

More particularly, the organic aluminum compounds belonging to the aforesaid (i) include trialkylaluminum such as trimethylaluminum, triethylaluminum and tributylaluminum; trialkenylaluminum such as triisoprenylaluminum; dialkylaluminum alkoxides such as diethylaluminum ethoxide and dibutylaluminum botoxide; alkylaluminum sesquialkoxides such as ethylaluminum sesquiethoxide and butylaluminum sesquibutoxide; alkylaluminum partially alkoxylated and having an average composition represented by $R^1_{2.5}Al(OR^2)_{0.5}$; dialkylaluminum halides such as diethylaluminum chloride, dibutylaluminum chloride and diethylaluminum bromide; alkylaluminum sesquihalides such as ethylaluminum sesquichloride, butylaluminum sesquichloride and ethylaluminum sesquibromide; partially halogenated alkylaluminum such as alkylaluminum dihalides, e.g., ethylaluminum dichloride, propylaluminum dichloride and butylaluminum dibromide; dialkylaluminum hydrides such as diethylaluminum hydride and dibutylaluminum hydride; partially hydrogenated alkylaluminum such as alkylaluminum dihydrides, e.g. ethylaluminum dihydride and propylaluminum dihydride; and partially alkoxylated and halogenated alkylaluminum such as ethylaluminum ethoxy chloride, butylaluminum butoxy chloride and ethylaluminum ethoxy bromide.

Furthermore, organic aluminum compounds having two or more aluminum atoms bonded to each other via oxygen atom or nitrogen atom may also be used as the compounds belonging to the aforesaid (i). These compounds include $(C_2H_5)_2AlOAl(C_2H_5)_2$, $(C_2H_5)_2AlOAl(C_4H_9)_2$ and

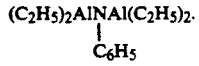

The compounds belonging to the aforesaid (ii) include $LiAl(C_2H_5)_4$ and $LiAl(C_7H_{15})_4$.

Of these compounds, preferred are those prepared by mixing the above-mentioned organic aluminum compounds or the above-mentioned organic aluminum suitably with aluminum trihalides so that an average composition represented by the formula $R_nAlX_{3-n}$ (wherein R is alkyl, X is halogen, and n is $2 \leq n \leq 3$) is satisfied. Particularly preferred are organic aluminum compounds having an average composition represented by the above-mentioned formula in which R is alkyl of 1–4 carbon atoms, X is chlorine and n is $2.1 \leq n \leq 9$.

The organometallic compound catalyst component (B) of a metal of Group I to III of the periodic table includes, in addition to organic aluminum, for example, organic zinc, organic boron, organic beryllium, organic lithium and organic magnesium.

In the case in which the catalysts for preparing ethylene polymers of the present invention as illustrated above are used in polymerizing ethylene or ethylene and α-olefin, specific amounts of the ethylene or ethylene and α-olefin may be preliminarily polymerized in the manner as will be mentioned later.

Subsequently, processes for preparing ethylene polymers by using the above-mentioned catalysts of the present invention are illustrated hereinafter.

In the present invention, ethylene homopolymers or copolymers of ethylene and other olefins may be prepared by the use of the catalysts of the invention as illustrated above, and copolymers of ethylene and polyene or copolymers of ethylene, α-olefin and polyene may also be prepared. Olefins other than ethylene usable in the present invention are, for example, propylene, 1-butene, 1-pentene, 1-hexene, 4-methyl-1-pentene, 3-methyl-1-pentene, 3-methyl-1-butene, 1-octene, 1-decene and the like. The above-mentioned polyene includes butadiene, isoprene, hexadiene, dicyclopentadiene, 5-ethylidene-2-norbornene and the like.

In the present invention, it is preferable to prepare copolymers containing at least about 70% by weight of ethylene. It is also desirable to prepare low density ethylene copolymers having a density of 0.880–0.970 g/cm$^3$, particularly 0.890–0.940 g/cm$^3$ by copolymerizing ethylene and small amounts of α-olefin by means of slurry polymerization, or particularly by means of vapor phase polymerization.

Polymerization of olefin may be carried out in liquid or vapor phase in the presence or absence of inert solvents. The inert solvents used in the polymerization include, for example, aliphatic hydrocarbons such as propane, butane, pentane, hexane, octane, decane and kerosene; alicyclic hydrocarbons such as cyclopentane, methylcyclopentane, cyclohexane and methylcyclohexane; and aromatic hydrocarbons such as benzene, toluene, xylene and ethylbenzene.

When ethylene copolymers low, in particular, in density are prepared, it is desirable to employ vapor phase polymerization.

The amounts of catalyst components used in the polymerization reaction of olefin may be suitably changed or selected, for instance, the titanium catalyst component may be used in such an amount that said component, calculated as titanium atom, becomes preferably about 0.0001 to about 1 mmole, especially about 0.001 to about 0.5 mmole per liter of the reaction volume, and the organic aluminum compound may be used in such an amount that a ratio of aluminum/titanium (atomic ratio) becomes about 1 to about 2000, preferably about 5 to about 100. The polymerization temperature employed is preferably 20°–150° C., further preferably 40°–100° C. The polymerization pressure employed is from atmosphere to about 100 kg/cm-G, preferably about 2 to about 50 kg/cm$^2$-G.

In carrying out the olefin polymerization, it is desirable to allow hydrogen to coexist with the reaction system in order to regulate a molecular weight of the resulting polymer.

The polymerization may be carried out either batchwise or continuously, and also may be carried out at two or more stages under different conditions.

In advance of the preparation of ethylene polymers in the present invention by using the above-mentioned carrier-supported titanium catalyst component (A) and organometallic compound catalyst component (B) of a metal of the Group I to IIIA of the periodic table, it is desirable to carry out in the presence of at least the titanium catalyst component and organic aluminum compound component a preliminary polymerization of ethylene or ethylene and α-olefin in a polymerization amount, based on 1 mg of titanium in said titanium catalyst component, of usually at least 5 g, preferably 10–3000 g and further preferably 20–1000 g.

The preliminary polymerization may be carried out in the presence or absence of inert hydrocarbon solvents. The inert hydrocarbon solvents used are those mentioned previously, and of such hydrocarbon solvents, particularly preferred are aliphatic hydrocarbons of 3–10 carbon atoms or alicyclic hydrocarbons of 5–10 carbon atoms.

The α-olefins used in carrying out the preliminary polymerization preferably include those having less than 10 carbon atoms such as ethylene, propylene, 1-butene, 1-pentene, 4-methyl-1-pentene, 3-methyl-1-pentene, 1-heptene, 1-octene and 1-decene, further preferably those of 2 to 6 carbon atoms, and particularly preferred is ethylene alone or a combination of ethylene and the above-mentioned α-olefin. These α-olefins may be used singly, or may be used in admixture of two or more so far as crystalline polymers are prepared.

The polymerization temperature employed in the preliminary polymerization is generally from −40° to 100° C., preferably from −20° to 60° C. and further preferably from −10° C. to 40° C. In the preliminary polymerization, hydrogen may also be allowed to coexist therewith.

In carrying out the preliminary polymerization, the organometallic compound catalyst component (B) of a metal of the Group I to IIIA of the periodic table represented by organic aluminum is used in an amount, based on 1 gram atom of titanium in the titanium catalyst component, of usually at least 0.1 gram atom, preferably from 0.5 gram atom to 200 gram atom and further preferably from about 1 gram atom to about 30 gram atom.

In carrying out the preliminary polymerization, various electron donor components mentioned previously may also be allowed to coexist with the reaction system.

EFFECT OF THE INVENTION

According to the present invention, it is possible to polymerize olefins with high activity and also possible to obtain granular olefin polymers which have a narrow distribution of composition of the resulting copolymer, a narrow particle size distribution and a high bulk density of polymer.

The present invention is illustrated below with reference to examples, but it should be construed that the invention is in no way limited to those examples.

EXAMPLE 1

Preparation of titanium catalyst component

In 40 ml of purified n-decane was suspended 10 g of silica (F952) produced by Fuji Davison Co. which had been fired at 200° C. for 2 hours and then at 700° C. for 5 hours. To this supsension was then added 50 ml of an n-decane solution containing 50 mmoles of triethylaluminum, and the suspension thus obtained was stirred at 90° C. for 2 hours to carry out the reaction (contact) of silica with triethylaluminum.

After the completion of the reaction, a solids portion was separated by filtration from the reaction liquid. The solids portion thus obtained contained aluminum in an amount equivalent to 1.1 mmol atom per 1 g of silica.

In 100 ml of n-decane was suspended 9.0 g of this solids portion, and the suspension obtained was incorporated with 6.4 ml (equivalent to about 6.4 mmoles of Mg) of a decane solution of magnesium chloride obtained by heating and stirring a mixture of 48 g of magnesium chloride, 197 g of 2-ethylhexanol and 175 g of n-decane at 140° C. for 2 hours, and the resulting suspension was elevated in temperature to 80° C. After the lapse of about 1 hour, the suspension was incorporated with 7.7 mmols of diethylaluminum chloride, and the reaction was carried out further at 80° C. for 1 hour. Subsequently, a solids portion was separated from the reaction mixture and suspended again in 100 ml of n-decane. Thereafter, 1.9 mmoles of mono-2-ethylhexoxy-trichlorotitanium was added to the suspension, and the reaction was carried out with stirring at 80° C. From the reaction mixture, a solids portion was separated by filtration, and the solids portion thus separated was washed twice with 100 ml of hexane to prepare a carrier-supported titanium catalyst component [A].

The amount of titanium contained in the titanium catalyst component obtained was 0.5% by weight.

Preliminary polymerization

A 400-ml cylindrical flask equipped with a stirrer was charged with 200 ml of purified hexane, 0.6 mmole of triethylaluminum and 0.2 mmole, calculated as titanium atom, of the above-mentioned titanium catalyst component [A], and ethylene was fed to the flask at 30° C. and a rate of 8N l/hr over a period of 3 hours to effect the preliminary polymerization of ethylene. The amount of the polyethylene formed was 142 g per mmole of Ti.

Polymerization of ethylene

A 2-liter capacity autoclave thoroughly purged with nitrogen and charged with 150 g of sodium chloride as a dispersing agent was subjected to pressure reducing treatment with a vacuum pump for 2 hours while heating at 90° C. so that the internal pressure of the autoclave might become less than 50 mm Hg. Subsequently, the temperature of the autoclave was lowered to room temperature and the interior of the autoclave was replaced with ethylene. Thereafter, 0.5 mmole of triethylaluminum, 0.5 mmole of diethylaluminum chloride and 9 ml of hexene-1 were added to the autoclave, and the system was tight sealed. The temperature to the autoclave was then elevated to 60° C., and the autoclave was charged with 1 kg/cm² of hydrogen and 0.005 mmole, calculated as titanium atom, of the catalyst component which had undergone the above-mentioned preliminary polymerization, while futher applying pressure to the system by feeding ethylene thereto. During polymerization, the temperature of the system was maintained at 80° C. and the pressure was maintained at 8 kg/cm²G by feeding ethylene thereto. After the addition of the titanium catalyst component, 36 ml of hexene-1 was fed to the system over a period of 1 hour by using a pump. The polymerization was terminated 1 hour after the addition of the titanium catalyst component.

After the completion of the polymerization, the contents of the autoclave were poured in about 1 liter of water. The resulting mixture was stirred for about 5 minutes, practically the whole amount of sodium chloride was dissolved in water, and only the resulting polymer came to the surface of water. The floating polymer was recovered, throughly washed with methanol, and then dried at 80° C. overnight under reduced pressure.

A composition of the titanium catalyst components and results of the polymerization are shown in Table 1.

EXAMPLES 2-10

Titanium catalysts were prepared by repeating the same procedure as described in Example 1 except that in place of the 50 mmoles of triethylaluminum and 7.7 mmoles of diethylaluminum chloride used in the preparation of the titanium catalyst in Example 1, there were used the compounds shown in Table 1. Using the titanium catalysts thus prepared, preliminary polymerization and copolymerization of ethylene and hexene-1 were carried out.

Compositions of the catalysts and results of the polymerization are shown in Table 1.

In this connection, methylaluminoxane used in Example 5 was synthesized by the following procedure.

Synthesis of aluminoxane

A 1-liter glass flask equipped with a stirrer and thoroughly purged with nitrogen was charged with 74 g of $Al_2(SO_4)_3 \cdot 14H_2O$ and 250 ml of toluene, and cooled to 0° C. To the flask was then added dropwise 250 ml of toluene containing 100 ml of trimethylaluminum over a period of 1.5 hours. Subsequently, the temperature of the flask was elevated to 40° C. over a period of 2 hours, and the reaction was continued at that temperature for 48 hours. After the reaction, the reaction mixture was separated by filtration into solid and liquid, and from the separated liquid, low boiling matters were removed by means of an evaporator, and the residue was recovered by the addition of toluene as a toluene solution. A molecular weight of aluminoxane obtained from the freezing point depression of benzene was 891.

EXAMPLES 11-12

Carrier-supported titanium catalysts were prepared by repeating the same procedure as in Example 1 except that the mono-2-ethylhexoxytrichlorotitanium was replaced by compounds as shown in Table 2, and the preliminary polymerization and copolymerization of ethylene and hexene-1 were carried out.

EXAMPLE 13

Following the same procedure as in Example 1, 10 g of silica was allowed to react with 50 mmoles of triethylaluminum to prepare a treated carrier onto which aluminum atoms had been fixed in an amount equivalent to 1.3 mmoles per 1 g of silica. To a suspension of the treated carrier in 100 ml of n-decane was added 6.4 ml of a decane solution of a magnesium compound obtained by reaction of 104.8 g of ethoxymagnesium chloride, 390 g of 2-ethylhexanol and 355 g of n-decane at 140° C. for 2 hours, and the temperature of the suspension was elevated to 80° C., and about 1 hour thereafter said temperature was lowered to 55° C. To this suspension was then added 30 ml of silicon tetrachloride, and the reaction was carried out at 55° C. for 2 hours. Subsequently, a solids portion separated by filtration was suspended again in 100 ml of n-decane, followed by the addition of 7.7 mmoles of diethylaluminum chloride, and the reaction was carried out at 80° C. for 1 hour. The reaction for supporting the titanium compound on the carrier was carried out in the same manner as in Example 1 to prepare a titanium catalyst component. Using the titanium catalyst component thus prepared, the preliminary polymerization and copolymerization of ethylene and hexene-1 were carried out in the same manner as in Example 1.

The composition of the catalyst and results of the polymerization were as shown in Table 2.

EXAMPLE 14

A catalyst was prepared by repeating Example 13 except that the decane solution of a magnesium compound obtained by reaction of 104.8 g of ethoxymagnesium chloride, 390 g of 2-ethylhexanol and 355 g of n-decane at 140° C. for 2 hours was substituted for a heptane solution containing 6.4 mmoles of magnesium bis-2-ethylhexoxide. Using the catalyst thus prepared, the preliminary polymerization and copolymerization of ethylene and hexene-1 were carried out in the same manner as in Example 13.

The composition of the catalyst and results of the polymerization were as shown in Table 2.

TABLE 1

| Ex. | Organic Al compound (ii) [mmol] | Reducing organo-metallic compound [II] | composition of catalyst [wt %] | | | | | Average valence of Ti | Polymerization activity [g-PE/mM-Ti] | Density [g/ml] | MI [dg/min] | Apparent bulk density [g/ml] | Average particle diameter of polymer [μm] | Particle size distribution [wt %] | |
|---|---|---|---|---|---|---|---|---|---|---|---|---|---|---|---|
| | | | Ti | Mg | Al | Cl | OR | | | | | | | >840 μm | 250 μm> |
| 1 | $Et_3Al$ | $Et_2AlCl$ | 0.5 | 1.1 | 1.7 | 11 | 7.6 | 3.0 | 19300 | 0.919 | 1.5 | 0.39 | 820 | 47 | 0 |
| 2 | $Me_3Al$ | $Et_2AlCl$ | 0.6 | 1.6 | 1.7 | 10 | 11 | 3.0 | 18600 | 0.922 | 2.9 | 0.39 | 790 | 44 | 0.2 |
| 3 | iso $Bu_3Al$ | $Et_2AlCl$ | 0.8 | 2.0 | 1.5 | 11 | 7.5 | 3.2 | 10400 | 0.922 | 2.4 | 0.38 | 740 | 36 | 0.3 |
| 4 | (2-Ethylhexyl)$_3$Al | $Et_2AlCl$ | 0.6 | 1.7 | 1.7 | 10 | 11 | 3.1 | 8900 | 0.922 | 1.0 | 0.37 | 660 | 35 | 0.3 |
| 5 | methyl aluminoxane | $Et_2AlCl$ | 0.9 | 2.7 | 6.4 | 10 | 17 | 3.4 | 8600 | 0.924 | 0.8 | 0.37 | 580 | 20 | 0.5 |
| 6 | $Et_3Al$ | $Et_3Al$ | 0.6 | 1.3 | 1.6 | 11 | 13 | 3.0 | 17200 | 0.918 | 1.3 | 0.38 | 780 | 46 | 0 |
| 7 | $Et_3Al$ | (2-Ethylhexyl)$_3$Al | 0.5 | 1.2 | 1.6 | 10 | 9.2 | 3.1 | 16900 | 0.921 | 1.1 | 0.37 | 770 | 43 | 0.1 |
| 8 | $Et_3Al$ | iso $Bu_3Al$ | 0.8 | 1.8 | 1.7 | 11 | 9.6 | 3.2 | 15000 | 0.919 | 1.4 | 0.36 | 760 | 40 | 0.1 |
| 9 | $Et_3Al$ | iso $Bu_2AlCl$ | 0.7 | 1.7 | 1.8 | 12 | 12 | 3.1 | 16200 | 0.923 | 0.6 | 0.36 | 770 | 40 | 0.1 |
| 10 | $Et_3Al$ | Bn Mg Et | 0.5 | 1.8 | 1.3 | 11 | 6.3 | 3.6 | 7700 | 0.923 | 0.9 | 0.35 | 530 | 22 | 0.4 |

TABLE 2

| Ex. | Mg compound (iii) | Ti compound [III] | composition of catalyst [wt %] | | | | | Average valence of Ti | Polymerization activity [g-PE/mM-Ti] | Density [g/ml] | MI [dg/min] | Apparent bulk density [g/ml] | Average particle diameter of polymer [μm] | Particle size distribution [wt %] | |
|---|---|---|---|---|---|---|---|---|---|---|---|---|---|---|---|
| | | | Ti | Mg | Al | Cl | OR | | | | | | | >840 μm | 177 μm> |
| 11 | $MgCl_2$ | $TiCl_4$ | 0.6 | 1.3 | 1.5 | 11 | 7.9 | 3.0 | 17300 | 0.919 | 1.6 | 0.37 | 770 | 40 | 0.2 |
| 12 | $MgCl_2$ | Ti(0-2-ethylhexyl)$_4$ | 0.4 | 1.4 | 1.4 | 10 | 13 | 3.3 | 15100 | 0.923 | 0.3 | 0.36 | 750 | 38 | 0.3 |
| 13 | EtOMgCl | $Cl_3$Ti(0-2-ethylhexyl) | 0.7 | 1.3 | 1.8 | 10 | 12 | 3.2 | 10700 | 0.922 | 3.3 | 0.36 | 630 | 36 | 0.3 |
| 14 | Mg(0-2-ethylhexyl)$_2$ | $Cl_3$Ti(0-2-)ethylhexyl) | 0.7 | 1.7 | 1.6 | 9 | 17 | 3.4 | 9400 | 0.921 | 2.1 | 0.35 | 600 | 25 | 0.5 |

EXAMPLE 15

Preparation of titanium catalyst component

In 40 ml of n-decane was suspended 10 g of silica (F952) of Fuji Davison Co. which had been fired at 200° C. for 2 hours and then at 700° C. for 5 hours. To this suspension was added 43 ml of a heptane solution containing 50 mmoles of butylethylmagnesium, and the reaction was carried out at 90° C. for 2 hours. After the completion of the reaction, a solids portion was separated by filtration from the reaction mixture. The solids portion thus separated contained magnesium atoms in an amount equivalent of 2.5 mmoles per 1 g of silica.

To a suspension of 8 g of the thus obtained solids portion in 100 ml of n-decane was added 6.4 ml (corresponding to about 6.4 mmoles of Mg) of magnesium chloride obtained by heating of 95 g of magnesium chloride, 390 g of 2-ethylhexanol and 355 g of n-decane at 140° C. for 2 hours, and the temperature of the suspension was elevated to 80° C. After the lapse of about 1 hour, the suspension was incorporated with 7.7 mmoles of diethylaluminum chloride, and the reaction was carried out at 80° C. for 1 hour. Subsequently, a solids portion was separated by filtration from the reaction mixture, and this solids portion was suspended again in 100 ml of n-decane. The suspension was incorporated with 1.9 mmoles of mono-2-ethylhexoxytrichlorotitanium, and the reaction was carried out at 80° C. for 1 hour. A solids portion was then separated by filtration from the reaction mixture, and washed twice with 100 ml of hexane to prepare a carrier-supported titanium catalyst component [A].

Preliminary polymerization

A 400 ml cylindrical flask equipped with a stirrer was charged with 200 ml of purified hexane, 0.6 mmole of triethylaluminum and 0.2 mmol, calculated as titanium atom, of the above-mentioned titanium catalyst component [A], followed by feeding ethylene at 30° C. and a rate of 8N l/hr over a period of 3 hours, and the preliminary polymerization of ethylene was carried out. The amount of the resulting polyethylene was 96 g per 1 g of the catalyst.

Polymerization of ethylene

A 2-liter capacity autoclave thoroughly purged with nitrogen and charged with 150 g of sodium chloride as a dispersing agent was subjected to pressure reducing treatment with a vacuum pump for 2 hours while heating at 90° C. so that the internal pressure of the autoclave might become less than 50 mm Hg. Subsequently, the temperature of the autoclave was lowered to room temperature, and the interior of the autoclave was replaced with ethylene. Thereafter, 0.5 mmole of triethylaluminum, 0.5 mmole of diethylaluminum chloride and 9 ml of hexene-1 were added to the autoclave, and the system was tight sealed. The temperature of the autoclave was then elevated to 60° C., and the autoclave was charged with 1 kg/cm$^2$ of hydrogen and 0.005 mmole, calculated as titanium atom, of the titanium catalyst component which had been subjected to the above-mentioned preliminary polymerization, while further applying pressure to the system by feeding ethylene thereto. During polymerization, the temperature of the system was maintained at 80° C., and the pressure was maintained at 8 kg/cm$^2$G by feeding ethylene thereto. After the addition of the titanium catalyst component, 36 ml of hexene-1 was fed to the system over a period of 1 hour by using a pump. The polymerization was terminated 1 hour after the addition of the titanium catalyst.

After the completion of the polymerization, the contents of the autoclave were poured in about 1 liter of water. The resulting reaction mixture was stirred for 5 minutes, whereupon practically the whole amount of sodium chloride was dissolved in water, and only the resulting polymer came to the surface of water. The floating polymer was recovered, thoroughly washed with methanol, followed by drying at 80° C. under reduced pressure overnight.

A composition of the titanium catalyst and results of the polymerization are shown in Table 3.

EXAMPLES 16–19

Titanium catalysts were prepared by repeating the same procedure as described in Example 15 except that the butylethylmagnesium and diethylaluminum chloride were replaced by compounds as shown in Table 3, and using the titanium catalysts thus prepared, the preliminary polymerization and copolymerization of ethylene and hexene-1 were carried out in the same manner as in Example 15.

Compositions of the catalysts obtained and results of the copolymerization are shown in Table 3.

EXAMPLES 20–21

Titanium catalysts were prepared by repeating the same procedure as described in Example 15 except that the mono-2-ethylhexoxytrichlorotitanium used in preparing the titanium catalyst of Example 15 was replaced with compounds shown in Table 4, and using the titanium catalysts thus prepared, the preliminary polymerization and copolymerization of ethylene and hexene-1 were carried out.

Compositions of the catalysts and results of the copolymerization are shown in Table 4.

EXAMPLE 22

Following the same procedure as described in Example 15, there were prepared a treated carrier onto which magnesium atoms in an amount equivalent to 2.5 mmoles per 1 g of silica were fixed by reaction of 10 g of silica and 50 mmoles of butylethylmagnesium. To a suspension of the treated carrier in 100 ml of n-decane was added 6.4 ml of a decane solution of a magnesium compound obtained by reaction of 104.8 g of ethoxymagnesium chloride, 390 g of 2-ethylhexanol and 355 g of n-decane at 140° C. for 2 hours, and the temperature of the suspension was elevated to 80° C. After the lapse of 1 hour, the temperature of the suspension was lowered to 55° C., and the reaction was carried out at 55° C. for 2 hours. Subsequently, a solids portion was separated by filtration from the reaction mixture, suspended again in 100 ml of n-decane, incorporated with 7.7 mmoles of diethylaluminum chloride, and the reaction was carried out at 80° C. for 1 hour.

Thereafter, the reaction for supporting the titanium compound on the carrier was carried out in the same manner as in Example 15 to prepare a titanium catalyst component. Following the same procedure as described in Example 15, the preliminary polymerization and copolymerization of ethylene and hexene-1 were carried out.

A composition of the catalyst and results of the copolymerization are shown in Table 4.

EXAMPLE 23

A catalyst was prepared by repeating the same procedure as described in Example 22 except that the decane solution obtained by reaction of 104.8 g of ethoxymagnesium chloride, 390 g of 2-ethylhexanol and 355 g of n-decane at 140° C. for 2 hours was replaced by a heptane solution containing 5 mmoles of magnesium bis-2-ethylhexoxide, and the preliminary polymerization and copolymerization of ethylene and hexene-1 were carried out in the same manner as in Example 22.

A composition of the catalyst and results of the copolymerization are shown in Table 4.

TABLE 3

| Ex. | Organo-metallic compound (ii) | Organic Al compound [II] | composition of catalyst [wt %] | | | | | Average valence of Ti | Polymerization activity [g-PE/mM-Ti] | Density [g/ml] | MI [dg/min] | Apparent bulk density [g/ml] | Average particle diameter of polymer [μm] | Particle size distribution [wt %] | |
|---|---|---|---|---|---|---|---|---|---|---|---|---|---|---|---|
| | | | Ti | Mg | Al | Cl | OR | | | | | | | >840 μm | 250 μm> |
| 15 | BuMgEt | Et₂AlCl | 0.7 | 4.5 | 0.4 | 8.2 | 10.8 | 3.1 | 13200 | 0.919 | 1.6 | 0.38 | 670 | 33 | 0.4 |
| 16 | (n-Hexyl)₂Mg | Et₂AlCl | 0.6 | 4.4 | 0.5 | 9.2 | 8.6 | 3.1 | 10700 | 0.921 | 0.8 | 0.37 | 620 | 30 | 0.4 |
| 17 | nBu₂Mg * | Et₂AlCl | 0.9 | 4.4 | 0.6 | 9.0 | 9.6 | 3.3 | 10200 | 0.920 | 1.9 | 0.37 | 630 | 30 | 0.3 |
| 18 | BuMgEt | isoBu₂AlCl | 0.5 | 4.4 | 0.3 | 8.8 | 11.0 | 3.4 | 9300 | 0.921 | 0.6 | 0.36 | 600 | 27 | 0.4 |
| 19 | BuMgEt | Et₃Al | 0.6 | 5.0 | 0.7 | 7.7 | 8.3 | 3.3 | 8700 | 0.919 | 1.1 | 0.36 | 570 | 22 | 0.7 |

(* MAGALA7.5E: a product of TEXAS ALKYLS)

TABLE 4

| Ex. | Mg compound (iii) | Ti compound [III] | composition of catalyst [wt %] | | | | | Average valence of Ti | Polymerization activity [g-PE/mM-Ti] | Density [g/ml] | MI [dg/min] | Apparent bulk density [g/ml] | Average particle diameter of polymer [μm] | Particle size distribution [wt %] | |
|---|---|---|---|---|---|---|---|---|---|---|---|---|---|---|---|
| | | | Ti | Mg | Al | Cl | OR | | | | | | | >840 μm | 177 μm> |
| 20 | MgCl₂ | TiCl₄ | 0.6 | 4.4 | 0.6 | 8.1 | 10.1 | 3.1 | 12600 | 0.919 | 2.1 | 0.38 | 660 | 30 | 0.3 |
| 21 | MgCl₂ | Ti(O-2-ethylhexyl)₄ | 0.4 | 4.1 | 0.5 | 8.0 | 8.9 | 3.2 | 9700 | 0.919 | 0.6 | 0.37 | 640 | 26 | 0.4 |
| 22 | EtOMgCl | Cl₃Ti(O-2-ethylhexyl) | 0.7 | 4.4 | 0.6 | 7.2 | 8.3 | 3.2 | 8800 | 0.922 | 1.6 | 0.36 | 580 | 23 | 0.6 |
| 23 | Mg(O-2-ethyl-hexyl)₂ | Cl₃Ti(O-2-)ethylhexyl) | 0.7 | 4.3 | 0.6 | 7.7 | 7.8 | 3.3 | 7900 | 0.918 | 1.6 | 0.35 | 550 | 24 | 0.7 |

EXAMPLE 24

Preparation of titanium catalyst component

In a 400 ml glass reactor thoroughly purged with nitrogen, 10 g of silica (F952 a product of Fuji Davison Co.), which had been fired at 200° C. for 2 hours and then at 700° C. for 5 hours, was allowed to react with 150 ml of trichlorosilane, and thereafter a solids portion was isolated by filtration from the reaction mixture.

A 400 ml glass reactor was charged with 9.8 g of the solids portion obtained above and 148 mg of n-decane, and to the reactor was then added dropwise over a period of 15 minutes 3.6 ml of a decane solution of magnesium chloride (1 mole MgCl₂/l) obtained in advance by heating of 48 g of magnesium chloride, 197 g of 2-ethylhexanol and 175 g of purified n-decane, the temperature of the reactor was elevated to 80° C., and the reaction was carried out at 80° C. for 1 hour. To the reactor was then added 4.3 mmoles of diethylaluminum chloride over a period of 15 minutes, and the reaction was carried out for an additional 1 hour, and a solids portion was separated from the reaction mixture by filtration. The solids portion thus separated was suspended in 100 ml of purified n-decane, and thereto was added 1.1 ml of a decane solution of 2-ethylhexoxytrichlorotitanium in an amount equivalent to 1.1 mmole-Ti. The reaction was then carried out at 80° C. for 1 hour, a solids portion was separated by filtration from the reaction mixture, and the solids portion separated was washed once with 200 ml of purified n-decane to obtain a carrier-supported titanium catalyst component. The amount of titanium contained in the titanium catalyst obtained was 0.05% by weight.

Preliminary polymerization

A 400 ml glass reactor thoroughly purged with nitrogen was charged with 150 ml of purified hexane, 0.45 mmol of triethylaluminum and 0.15 mmol, calculated as titanium atom, of the titanium catalyst component, and thereafter 35 g of ethylene was introduced over a period of 2 hours into the liquid phase portion of the reactor. After the completion of the polymerization, a solids portion was separated by filtration from the reaction mixture, and the residual solution was stored as a suspension in hexane.

Polymerization of ethylene

A 2-liter capacity autoclave thoroughly purged with nitrogen was charged with 250 g of sodium chloride as a dispersing agent, and subjected to pressure reducing treatment with a vacuum pump while heating at 90° C. so that the internal pressure of the autoclave might become less than 50 mm Hg. The temperature of the autoclave was lowered to room temperature. The autoclave was then charged while replacing the interior of said autoclave with ethylene with 0.5 mmol of triethylaluminum, 0.5 mmol of diethylaluminum and 9 ml of hexene-1, and the temperature of the autoclave was elevated to 80° C. The autoclave was charged with 0.8 kg/cm$^2$ of hydrogen at 60°-70° C. in the middle of the above temperature rise and further with 0.005 mmol, calculated as titanium atom, of the titanium catalyst component which had undergone the above-mentioned preliminary polymerization, while increasing the pressure of the system to 8 kg/cm$^2$G by introducing ethylene thereinto. After the temperature reached 80° C., 30 ml of hexene-1 was fed over a period of 1 hour to the autoclave by using a pump. Accordingly, the polymerization conditions employed included 80° C., 8 kg/cm$^2$ and 1 hour. After the lapse of the polymerization time as defined above, the polymerization was terminated by releasing the pressure and cooling the system. The contents of the autoclave were poured in about 1 liter of water, followed by stirring. Practically the whole amount of sodium chloride dissolved in water, and only the resulting polymer came to the water surface. The afloating polymer was wholly recovered, and thoroughly washed with methanol, followed by drying at 80° C. under reduced pressure overnight.

Physical properties of the polymer thus obtained are shown in Table 5.

EXAMPLES 25-27

Titanium catalyst components were prepared by repeating the same procedure as described in Example 24 except that the trichlorosilane used in Example 24 was replaced with the compounds as shown in Table 5, and the preliminary polymerization and polymerization of ethylene were conducted in the same manner as in Example 24.

Results are shown in Table 5.

EXAMPLE 28

Preparation of titanium catalyst component

A 400 ml glass reactor thoroughly purged with nitrogen was charged with 10 g of silica (F952, a product of Fuji Davison Co.), which had been fired at 200° C. for 2 hours and then at 700° C. for 5 hours, 40 ml of purified n-decane and 40 ml of a heptane solution of butylmagnesium in an amount of 53.6 mmol calculated as magnesium atom, and the reaction was carried out at 90° C. for 2 hours. Thereafter, the reactor was further charged with 12.3 ml of 2,2,2-trichloroethanol, and the reaction was further carried out at 80° C. for 1 hour. The reaction mixture was separated by filtration, and a solids portion was collected. To a suspension of 6.0 g of the solids portion collected above in purified n-decane was added 4.6 ml of 2-ethylhexanol, and the reaction was carried out at 110° C. for 3 hours. To the reaction system was added 10.4 mmol of triethylaluminum, and the reaction was carried out at 80° C. for 1 hour. Subsequently, 12.0 mmol of diethylaluminumchloride was added to the reaction system, and the reaction was continued at 80° C. for an additional 1 hour.

After the completion of the reaction, the reaction mixture was separated by filtration, and the separated solids portion was suspended in 50 ml of purified n-decane. To the suspension was then added 2.0 mmol of 2-ethylhexoxytitanium trichloride, and the reaction was carried out at 80° C. for 1 hour. A solids portion was separated by filtration from the reaction mixture to prepare a carrier-supported titanium catalyst component [A].

The catalyst thus prepared contained 0.42% by weight of Ti atom, 3.9% by weight of Mg atom, 26% by weight of Cl atom, 1.1% by weight of Al atom and 4.6% by weight of 2-ethylhexoxide.

Preliminary polymerization

A 400 ml cylindrical glass flask equipped with a stirrer was charged with 200 ml of purified hexane, 0.6 mmol of triethylaluminum and 0.2 mmol, calculated as titanium atom, of the above-mentioned titanium catalyst component [A], and ethylene was fed to the flask at 30° C. at a rate of 8N l/hr to carry out the preliminary polymerization. The amount of the resulting polyethylene was 142 g per mmol of Ti.

Polymerization of ethylene

A 2-liter capacity autoclave thoroughly purged with nitrogen was charged with 150 g of sodium chloride as a dispersing agent, and the autoclave was subjected to pressure reducing treatment with a vacuum pump while heating at 90° C. so that the internal pressure of said autoclave might become less than 50 mm Hg. Subsequently, the temperature of the autoclave was lowered

TABLE 5

| Ex. | Hlg-contg. compound (ii) | composition of catalyst [wt %] | | | | | Average valence of Ti | Polymerization activity [g-Pe/mM-Ti] | Density [g/ml] | MI [dg/min] | Apparent bulk density [g/ml] | Particle size distribution [wt %] | |
|---|---|---|---|---|---|---|---|---|---|---|---|---|---|
| | | Ti | Mg | Al | Cl | OR | | | | | | >840 μm | 250 μm> |
| 24 | HSiCl$_3$ | 0.05 | 0.5 | 0.8 | 11 | 0.5 | 3.1 | 6100 | 0.923 | 2.4 | 0.37 | 0.2 | 0.1 |
| 25 | SiCl$_4$ | 0.04 | 1.5 | 2.0 | 17 | 0.9 | 3.3 | 4500 | 0.922 | 1.8 | 0.37 | 0.1 | 0.2 |
| 26 | TiCl$_4$ | 4.0 | 1.7 | 1.5 | 16 | 1.6 | 3.2 | 3400 | 0.921 | 1.3 | 0.35 | 0.1 | 0.3 |
| 27 | MeSiCl$_3$ | 0.05 | 0.7 | 1.1 | 13 | 0.6 | 3.3 | 4800 | 0.928 | 2.1 | 0.35 | 0.1 | 0.2 | to room temperature. After replacing the interior of the autoclave with ethylene, 0.5 mmol of triethylaluminum, 0.5 mmol of diethylaluminum chloride and 9 ml of hexene-1 were added to the system which was then tight sealed. The system was heated and at 60° C. fed with 1.5 kg/cm² of hydrogen, and 0.007 mmol, calculated as titanium atom, of the catalyst component which had undergone the above preliminary polymerization while further applying pressure to the system by addition of ethylene. During the polymerization, the temperature was maintained at 80° C., and the pressure was maintained at 8 kg/cm² by feeding ethylene thereto. After the addition of the titanium catalyst component, 36 ml of hexene-1 was fed over a period of 1 hour to the system by using a pump. The polymerization was terminated 1 hour after the addition of the titanium catalyst.

After the completion of the polymerization, the contents of the autoclave were poured in about 1 liter of water. After stirring for about 5 minutes, practically the whole amount of sodium chloride dissolved in water, and only the resulting polymer came to the surface of water. The afloating polymer was recovered, and thoroughly washed with methanol, followed by drying at 80° C. under reduced pressure overnight.

A composition of the titanium catalyst component obtained is shown in Table 6, and results of the polymerization are shown in Table 7.

EXAMPLES 29-30

Titanium catalyst components were prepared individually by repeating the same procedure as described in Example 28 except that the heptane solution of butylethylmagnesium used in Example 28 was replaced with a heptane solution of di-n-hexylmagnesium (MAGALA ® DNHM-II, a product of Texas Alkyls) (Example 29) and a heptane solution of di-n-butylmagnesium/triethylaluminum (7.5:1) complex (MAGALA ® 7.5E, a product of Texas Alkyls) (Example 30). Using these catalysts as prepared, respectively, the polymerization was carried out in the same procedure as in Example 28.

Results are shown in Tables 6 and 7, respectively.

EXAMPLES 31-33

Titanium catalyst components were prepared individually by repeating the same procedure as described in Example 28 except that the 2,2,2-trichloroethanol used in Example 28 was replaced with 1,1,1-trichloro-2-propanol (Example 31), 2,2-dichloroethanol (Example 32) or β,β,β-trichlorotertiary butanol (Example 33). Using these catalysts as prepared, respectively, the polymerization was carried out in the same procedure as in Example 28.

Results are shown in Tables 6 and 7, respectively.

Example 34

A titanium catalyst component was prepared by repeating the same procedure as described in Example 28 except that the 4.6 ml of 2-ethylhexanol used was replaced with 9.5 ml of oleyl alcohol, followed by carrying out the polymerization in the same manner as in Example 28.

Results are shown in Tables 6 and 7, respectively.

TABLE 6

| Ex. | Ti/Mg mol ratio | Al/Mg mol ratio | Halogen/Mg mol ratio | Alkoxy/Mg wt. ratio | Valence of Ti |
|---|---|---|---|---|---|
| 28 | 0.055 | 0.25 | 4.6 | 1.2 | 3.1 |
| 29 | 0.063 | 0.28 | 4.4 | 1.2 | 3.2 |
| 30 | 0.061 | 0.27 | 4.6 | 1.3 | 3.1 |
| 31 | 0.054 | 0.33 | 3.9 | 1.1 | 3.3 |
| 32 | 0.10 | 0.36 | 4.2 | 1.2 | 3.2 |
| 33 | 0.017 | 0.27 | 4.7 | 1.3 | 3.2 |
| 34 | 0.076 | 0.30 | 4.7 | 1.3 | 3.2 |

TABLE 7

| Ex. | Polymerization activity g-PE/mM-Ti | Density [g/ml] | MI [dg/min] | Apparent bulk density [g/ml] | Average particle diameter of polymer [μm] |
|---|---|---|---|---|---|
| 28 | 18200 | 0.921 | 2.0 | 0.38 | 660 |
| 29 | 16300 | 0.922 | 1.3 | 0.37 | 650 |
| 30 | 15900 | 0.923 | 2.6 | 0.36 | 630 |
| 31 | 17200 | 0.919 | 1.9 | 0.36 | 630 |
| 32 | 16000 | 0.935 | 1.6 | 0.37 | 620 |
| 33 | 15500 | 0.932 | 2.3 | 0.37 | 600 |
| 34 | 15900 | 0.927 | 1.6 | 0.36 | 610 |

What is claimed is:

1. A carrier-supported titanium catalyst component containing magnesium, aluminum, halogen and titanium as essential ingredients, said titanium catalyst component being the product prepared by reacting the following (I), (II) and (III):
   (I) a magnesium containing support obtained by previously bringing a support (i) into contact with (a) an organometallic compound of a metal of Group II to IIIA of the periodic table and having at least one hydrocarbon group attached directly to the metal atom or with (b) a halogen containing compound selected from the group consisting of halogenated hydrocarbon, hydrogen halide, halogen and a compound having halogen atoms directly attached to silicon, tin, phosphorus, titanium or vanadium element, and then bringing the contacted support into contact with a magnesium compound in the liquid state containing a magnesium compound and an alcohol, and having no reducing ability,
   (II) a reducing organometallic compound, and
   (III) a titanium compound in the liquid state.

2. A carrier-supported titanium catalyst component containing magnesium, aluminum, halogen and titanium as essential ingredients, said titanium catalyst component being the product prepared by the reaction of (I), (II) and (III):
   (I) a magnesium containing support obtained by previously bringing a support (i) into contact with an organic aluminum compound (ii), followed by a reaction with a liquid magnesium compound (iii) in the liquid state containing a magnesium compound and an alcohol, and having no reducing ability,
   (II) a reducing organometallic compound, and
   (III) a titanium compound in the liquid state.

3. A carrier-supported titanium catalyst component containing magnesium, aluminum, halogen and titanium as essential ingredients, said titanium catalyst component being the product prepared by the reaction of (I), (IIa) and (III):
(I) a magnesium containing support obtained by previously bringing a support (i) into contact with an organometallic compound of a metal other than aluminum of the Group II to IIIA of the periodic table in the liquid state having at least two hydrocarbon groups attached directly to the metal atom (iia), or with a halogen containing compound selected from the group consisting of halogenated hydrocarbon, hydrogen halide, halogen and a compound having halogen atoms directly attached to silicon, tin, phosphorus, titanium or vanadium element (iib), followed by a reaction with a magnesium compound in the liquid state containing a magnesium compound and an alcohol, and having no reducing ability (iii),
(IIa) an organic aluminum compound, and
(III) a titanium compound in the liquid state.

4. The catalyst component as claimed in claim 1, 2 or 3 wherein the magnesium compound in the liquid state having no reducing ability (iii) is a solution comprising a magnesium compound selected from the group consisting of $MgX_2$, $Mg(OR)X$, $Mg(OR)_2$ and carboxylates of magnesium (wherein X is halogen and R is hydrocarbon group), an alcohol and a hydrocarbon solvent, or a solution comprising a magnesium compound solvent, or a solution comprising a magnesium compound selected from the group consisting of $Mg(OR)_2$ and carboxylates of magnesium and a hydrocarbon solvent.

5. The catalyst component as claimed in claim 1, 2 or 3 wherein the titanium compound in the liquid state is a tetravalent titanium compound.

6. The catalyst component as claimed in claim 1, 2 or 3 wherein an average valence of titanium atom in the titanium catalyst component is less than 4.

7. The catalyst component as claimed in claim 1, 2 or 3 wherein an average particle diameter of the titanium catalyst component is 10–100 μm.

8. The catalyst component as claimed in claim 1, 2 or 3 wherein the support is an inorganic oxide containing a hydroxyl group.

9. The catalyst component as claimed in claim 1 or 2 wherein the reducing organometallic compound is an organic aluminum compound.

10. The catalyst component as claimed in claim 1, 2 or 3 wherein in the carrier-supported titanium catalyst component, Ti/Mg (atomic ratio) is greater than 0.01 but not greater than 1, Al/Mg (atomic ratio) is greater than 1 but not greater than 3, halogen/Mg (atomic ratio) is greater than 3 but not greater than 6, and RO group/Mg (R is a hydrocarbon group) in terms of weight ratio is greater than 1 but not greater than 15.

11. A carrier-supported titanium catalyst component containing magnesium, aluminum, halogen and titanium as essential ingredients, said titanium catalyst component being the product prepared by the reaction of (I), (IIa) and (III):
(I) a magnesium containing support obtained by previously bringing a support (i) into contact with a silicon compound having directly attached halogen or a halogen containing titanium compound having directly attached halogen, followed by a reaction with (iii) a magnesium compound in the liquid state and having no reducibility,
(IIa) an organic aluminum compound, and
(III) a titanium compound in the liquid state.

12. A process for preparing a carrier-supported titanium catalyst component containing magnesium, aluminum, halogen and titanium as essential ingredients, which process comprises preparing a magnesium containing support (I) by bringing a support into contact with an organometallic compound of a metal of the Group II to IIIA of the periodic table having at least one hydrocarbon group attached directly to the metal atom or with a halogen containing compound selected from the group consisting of halogenated hydrocarbon, hydrogen halide, halogen and a compound having halogen atoms directly attached to silicon, tin, phosphorus, titanium or vanadium element, contacting the treated support with a magnesium compound in the liquid state containing a magnesium compound and an alcohol, and having no reducing ability, and then bringing the resulting magnesium containing support into contact with a reducing organometallic compound (II) and a titanium compound in the liquid state (III).

13. A process for preparing a carrier-supported titanium catalyst component containing magnesium, aluminum, halogen and titanium as essential ingredients, which process comprises preparing a magnesium containing support (I) by bringing a support (i) into contact with an organic aluminum compound (ii), followed by contacting the treated support with a magnesium compound in the liquid state containing a magnesium compound and an alcohol, and having no reducing ability (iii), and then bringing the resulting magnesium containing support into contact with a reducing organometallic compound (II) and a titanium compound in the liquid state (III).

14. A process for preparing a carrier-supported titanium catalyst component containing magnesium, aluminum, halogen and titanium as essential ingredients, which process comprises bringing a support (i) into contact with an organometallic compound of a metal, other than aluminum, of the Group II to IIIA of the periodic table in the liquid state having at least two hydrocarbon groups attached directly to the metal atom (iia) or with a halogen containing compound selected from the group consisting of halogenated hydrocarbon, hydrogen halide, halogen and a compound having halogen atoms directly attached to silicon, tin, phosphorus, titanium or vanadium element (iib), contacting the treated support with a magnesium compound in the liquid state containing a magnesium compound and an alcohol, and having no reducing ability (iii), and then bringing the resulting magnesium containing support into contact with an organic aluminum compound (IIa) and a titanium compound in the liquid state (III).

15. A catalyst for use in preparing ethylene polymer said catalyst comprising a carrier-supported titanium catalyst component (A) containing magnesium, aluminum, halogen and titanium as essential ingredients, said catalyst component being obtained by a reaction of
(I) a magnesium containing support obtained by previously bringing into contact with an organometallic compound of a metal of the Group II to IIIA of the periodic table having at least one hydrocarbon group attached directly to the metal atom or with a halogen containing compound selected from the group consisting of halogenated hydrocarbon, hydrogen halide, halogen and a compound having halogen atoms directly attached to silicon, tin, phosphorus, titanium or vanadium element, followed by contact with a magnesium compound in the liquid state containing a magnesium compound and an alcohol, and having no reducing ability, (II) a reducing organometallic compound, and (III) a titanium compound in the liquid state, and an organometallic compound catalyst component (B) of a metal of the Group I to IIIA of the periodic table.

16. A catalyst for use in preparing ethylene polymer, said catalyst comprising a carrier-supported titanium catalyst component (A) containing magnesium, aluminum, halogen and titanium as essential ingredients, said catalyst component being obtained by a reaction of (I) a magnesium containing support obtained by previously bringing a support (i) into contact with an organometallic compound of a metal of the Group II to IIIA of the periodic table having at least one hydrocarbon group attached directly to the metal atom or with a halogen containing compound selected from the group consisting of halogenated hydrocarbon, hydrogen halide, halogen and a compound having halogen atoms directly attached to silicon, tin, phosphorus, titanium or vanadium element, followed by contact with a magnesium compound in the liquid state containing a magnesium compound an alcohol, and having no reducing ability, (II) a reducing organometallic compound, and (III) a titanium compound in the liquid state, and an organometallic compound catalyst component (B) of a metal of the Group I to IIIA of the periodic table, said catalyst containing preliminarily polymerized polyolefins of at least 5 g, based on 1 mg atom of titanium present in said carrier-supported titanium catalyst.

17. A catalyst for use in preparing ethylene polymer, said catalyst comprising a carrier-supported titanium catalyst component (A) containing magnesium, aluminum, halogen and titanium as essential ingredients, said catalyst component being obtained by a reaction of (I) a magnesium containing support obtained by previously bringing a support (i) into contact with an organic aluminum compound (ii), followed by a reaction with a magnesium compound in the liquid state containing a magnesium compound and an alcohol, and having nor educing ability (iii), (II) a reducing organometallic compound, and (III) a titanium compound in the liquid state, and an organometallic compound catalyst component (B) of a metal of the Group I to IIIA of the periodic table.

18. A catalyst for use in preparing ethylene polymer, said catalyst comprising a carrier-supported titanium catalyst component (A) containing magnesium, aluminum, halogen and titanium as essential ingredients, said catalyst component being obtained by a reaction of (I) a magnesium containing support obtained by previously bringing a support (i) into contact with an organic aluminum compound (ii), followed by a reaction with a magnesium compound in the liquid state containing a magnesium compound and an alcohol, and having no reducing ability (iii), (II) a reducing organometallic compound, and (III) a titanium compound in the liquid state, and an organometallic compound catalyst component (B) of a metal of the Group I to IIIA of the periodic table, said catalyst containing preliminarily polymerized polyolefins of at least 5 g, based on 1 mg atom of titanium present in said carrier-supported titanium catalyst.

19. A catalyst for use in preparing ethylene polymer, said catalyst comprising a carrier-supported titanium catalyst component (A) containing magnesium, aluminum, halogen and titanium as essential ingredients, said catalyst component being obtained by a reaction of (I) a magnesium containing support obtained by previously bringing a support (i) into contact with an organometallic compound of a metal other than aluminum of the Group II to IIIA of periodic table having at least two hydrocarbon group attached directly to the metal atom (iia) or with a halogen containing compound selected from the group consisting of halogenated hydrocarbon, hydrogen halide, halogen and a compound having halogen atoms directly attached to silicon, tin, phosphorus, titanium or vanadium element (iib), followed by a reaction with a magnesium compound in the liquid state containing a magnesium compound and an alcohol, and having no reducing ability (iii), (IIa) an organic aluminum compound, and (III) a titanium compound in the liquid state, and an organometallic compound catalyst component (B) of a metal of the Group I to IIIA of the periodic table.

20. A catalyst for use in preparing ethylene polymer, said catalyst comprising a carrier-supported titanium catalyst component (A) containing magnesium, aluminum, halogen and titanium as essential ingredients, said catalyst component being obtained by a reaction of (I) a magnesium containing support obtained by previously bringing a support (i) into contact with an organometallic compound of a metal other than aluminum of the Group II to IIIA of the periodic table in the liquid state having at least two hydrocarbon groups attached directly to the metal atom (iia) or with a halogen containing compound selected from the group consisting of halogenated hydrocarbon, hydrogen halide, halogen and a compound having halogen atoms directly attached to silicon, tin, phosphorus, titanium or vanadium element (iib), followed by a reaction with a magnesium compound in the liquid state containing a magnesium compound and an alcohol, and having no reducing ability (iii), (IIa) an organic aluminum compound, and (III) a titanium compound in the liquid state, and an organometallic compound catalyst component (B) of a metal of the Group I to IIIA of the periodic table, sid catalyst containing preliminarily polymerized polyolefins of at least 5 g, based on 1 mg atom of titanium present in said carrier-supported titanium catalyst.

* * * * *